INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson + Howson
his ATTORNEYS

INVENTOR
Theodore A. Federwitz
BY
Howson & Howson
his ATTORNEYS

INVENTOR
Theodore A. Federwitz
BY
Howson + Howson
his ATTORNEYS

INVENTOR
Theodore A. Federwitz
BY
Howson + Howson
his ATTORNEYS

INVENTOR
Theodore A. Federwitz
BY
Howson + Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

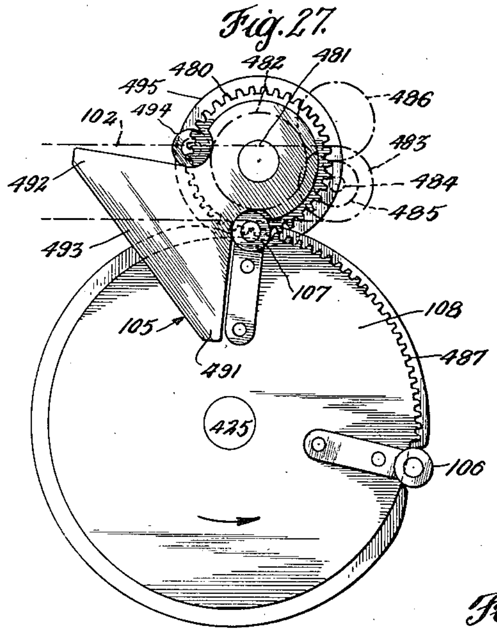
Fig. 27
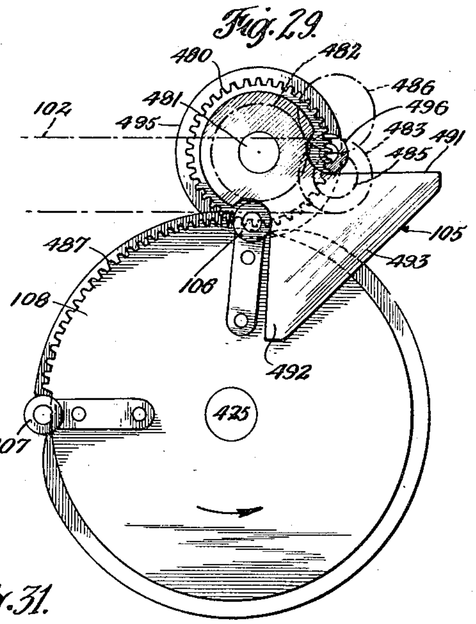
Fig. 29
Fig. 31.
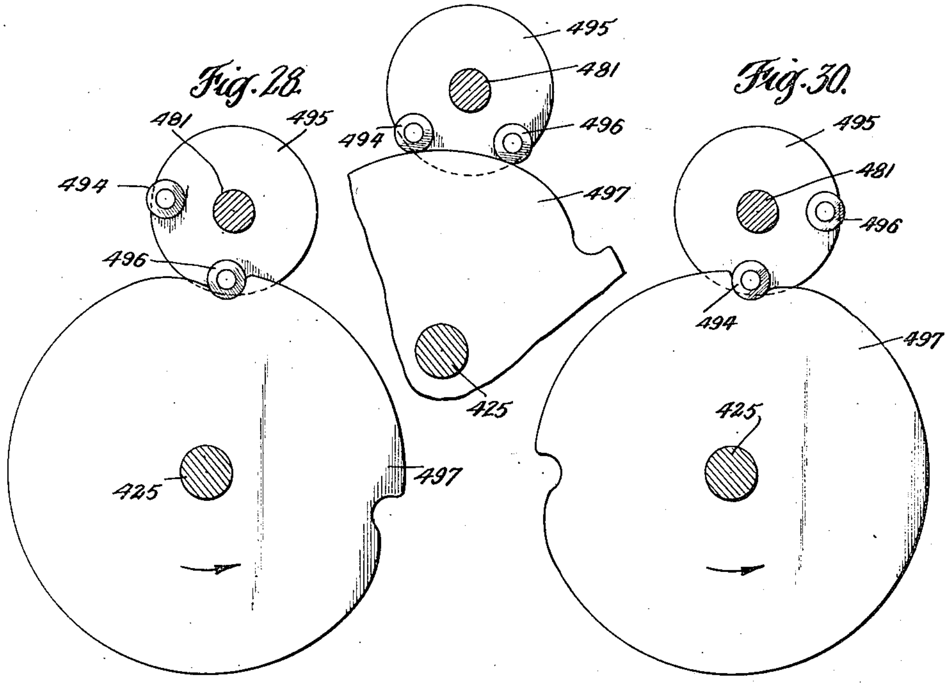
Fig. 28, Fig. 30
INVENTOR
Theodore A. Federwitz
BY
Howson & Howson
his ATTORNEYS INVENTOR
Theodore A. Federwitz
BY
Howson & Howson
his ATTORNEYS INVENTOR
Theodore A. Federwitz
BY
Howson + Howson
his ATTORNEYS Nov. 27, 1956

Filed May 10, 1951

T. A. FEDERWITZ

FEEDING AND DELIVERING DEVICES IN HECTOGRAPHIC ADDRESS PRINTERS 2,771,838

28 Sheets-Sheet 20

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
ATTORNEYS

INVENTOR
Theodore A. Federwitz
BY
Howson & Howson
ATTORNEYS

INVENTOR
Theodore A. Federwitz
BY
Howson + Howson
his ATTORNEYS

Nov. 27, 1956 T. A. FEDERWITZ 2,771,838

FEEDING AND DELIVERING DEVICES IN HECTOGRAPHIC ADDRESS PRINTERS

Filed May 10, 1951 28 Sheets-Sheet 26

INVENTOR
Theodore A. Federwitz
BY
Howson & Howson
his ATTORNEYS

INVENTOR
Theodore A. Federwitz
BY
Howson & Howson
his ATTORNEYS

INVENTOR
Theodore A. Federwitz
BY
Howson & Howson
his ATTORNEYS

United States Patent Office 2,771,838

Patented Nov. 27, 1956

2,771,838

FEEDING AND DELIVERING DEVICES IN HECTOGRAPHIC ADDRESS PRINTERS

Theodore A. Federwitz, Philadelphia, Pa., assignor to Business Systems, Inc., Philadelphia, Pa., a corporation of Pennsylvania

Application May 10, 1951, Serial No. 225,591

20 Claims. (Cl. 101—53)

This invention relates to duplicating machines and more particularly to the type of duplicator in which data are continuously transferred from a stack of master record cards to another medium. The present machine incorpates the stacking device disclosed and specifically claimed in my co-pending application Serial No. 47,834, filed September 4, 1948, now U. S. Patent No. 2,595,346.

In modern practice, it has become customary to use highly specialized cards on which a wide variety of data may be noted. Illustrations of such data are the name and address of a customer, subscriber or taxpayer, together with other information, which is frequently recorded by perforations in the card. Since these cards are master records, they must be run through the duplicator as well as a variety of other business machines, with a minimum of damage to the cards. Naturally, the cards are stacked in a predetermined geographical or alphabetical order and it is highly desirable that when the master cards have been run through a business machine, that this order be retained.

The present machine is intended primarily to facilitate the transfer of a printed or typed notation, usually a name and address, from the master card to some other medium which may be an envelope, wrapper or sheet of paper. Throughout the present description therefore, the cards from which the data are transferred will be designated "master cards" and the media to which the data are transferred to as "sheets."

In the operation of a duplicating or addressing machine such as contemplated by the present invention, several features are of particular importance. In the first place, the handling of the master cards from stack to stack must be positive, safe and accurately timed.

Due to the fact that it is necessary to transfer data to a wide variety of sheets which differ in thickness, size and evenness, I have incorporated several improved features in the structure which feeds and receives the sheets.

If for any reason there is no card at the printing station, a special detector instantly stops the machine before any sheets can be delivered without transfer data. The machine is capable of adjustment to locate the sheet feeding mechanism in relation to the position of each master card at the printing station so that the data may be transferred to any desired area on the sheets. Similarly, in the event that there may be any interruption in the feed of the sheets, the machine is automatically stopped.

In view of the above noted requirements and other advantages which will be apparent hereinafter, particular attention is directed to the safety control features which are interconnected between the electrical circuits and the suction conduits.

A primary object of the invention therefore, is to provide a duplicating machine which continuously handles master cards with a minimum of wear and damage to the cards.

A further object of the invention is to provide a duplicating machine in which a stack of master cards is automatically fed to a conveyor and thence delivered accurately to an underfeed stacker.

A further object of the invention is to provide a positive intermittent drive mechanism for the conveyer of a duplicating machine.

A further object of the invention is to provide suitable safety controls for a machine of the character described.

A further object of the invention is to provide in a machine of the character described, independent actuating mechanism for the sheet receiving table.

A further object of the invention is to provide in a duplicating machine, means for preventing actuation of the moistening roll in the event there is no sheet on the transfer drum.

A further object of the invention is to provide an improved mechanism for transferring sheets to and retaining sheets on the transfer drum.

A further object of the invention is to provide an improved mechanism for positively stripping the copy sheets from the printing drum.

A further object is to provide pairs of laterally spaced grippers on the conveyer chains and means for positively opening and closing these grippers when the chain is stationary.

A still further object of the invention is to provide an improved device for feeding master cards to the chain grippers and for feeding the copy sheets to the drum grippers.

A still further object of the invention is to provide a self-righting feed table for the copy sheets.

Further objects will be apparent from the specification and drawings in which.

Figure 3:
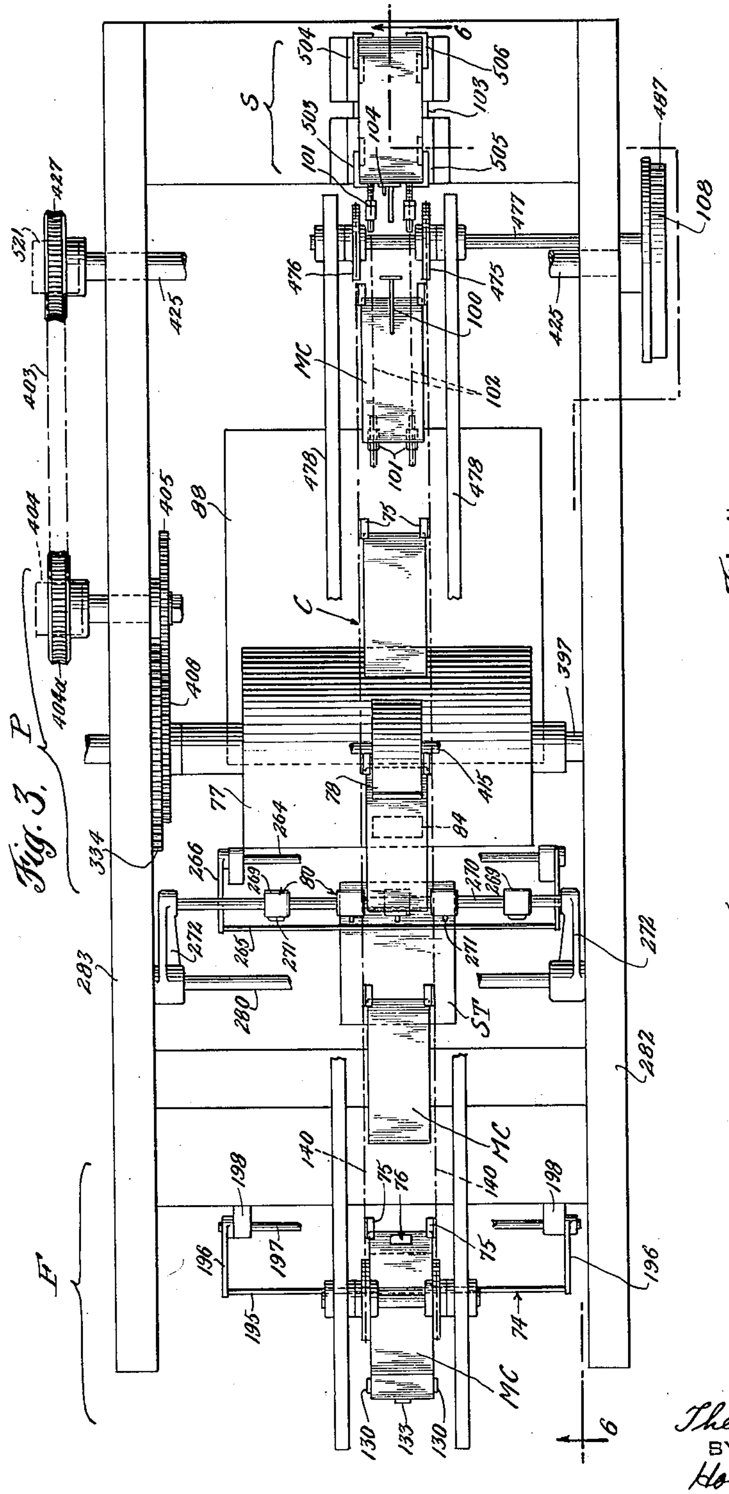
Fig. 3 is a top view in schematic form of the structure shown in Figs. 1 and 2.
Figure 5:
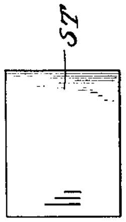
Fig. 5 shows a typical sheet to which data on the master card are transferred.
Figure 4:
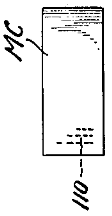
Fig. 4 shows one of the master cards used in the present machine.
Figure 6A:
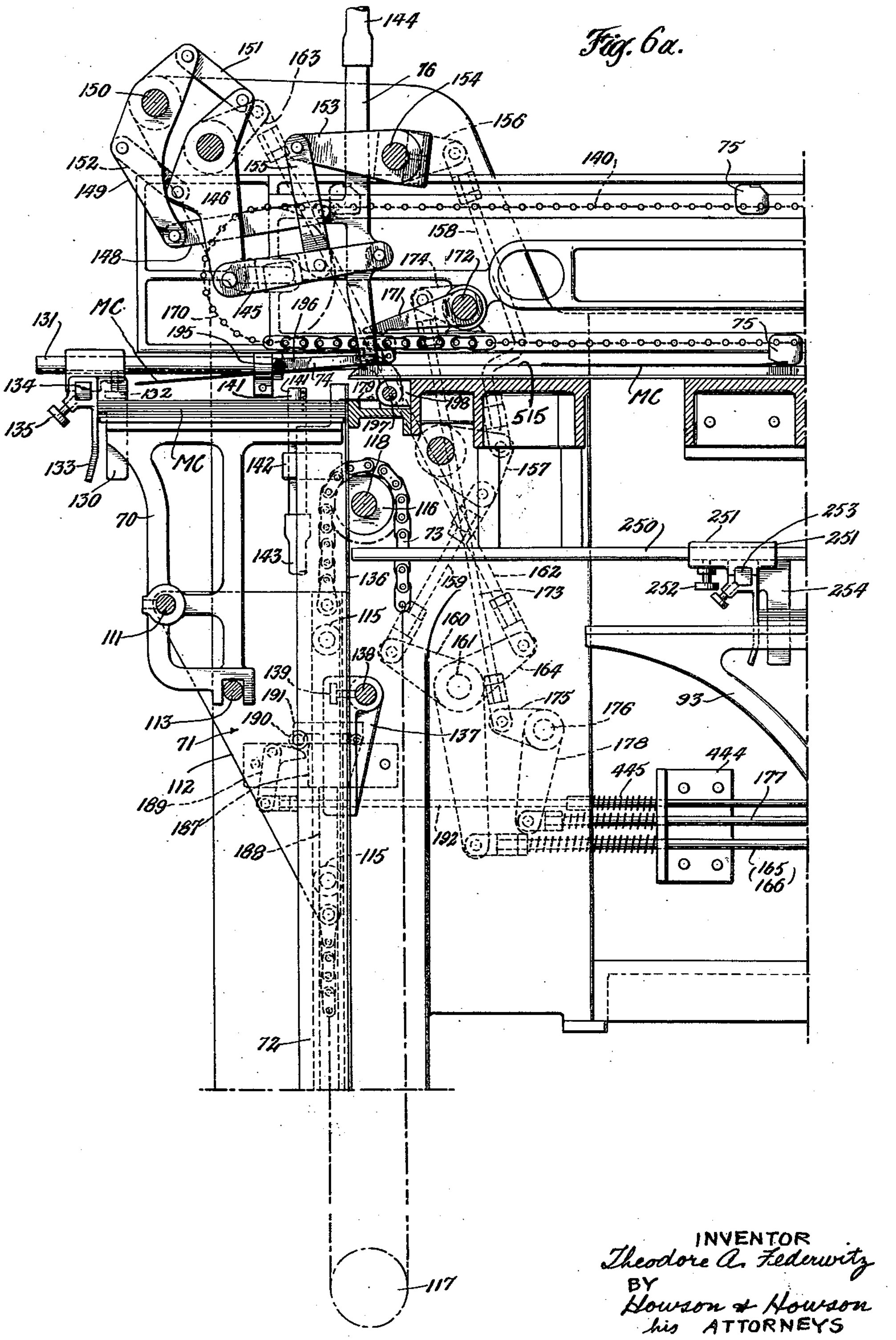
Figure 6B:
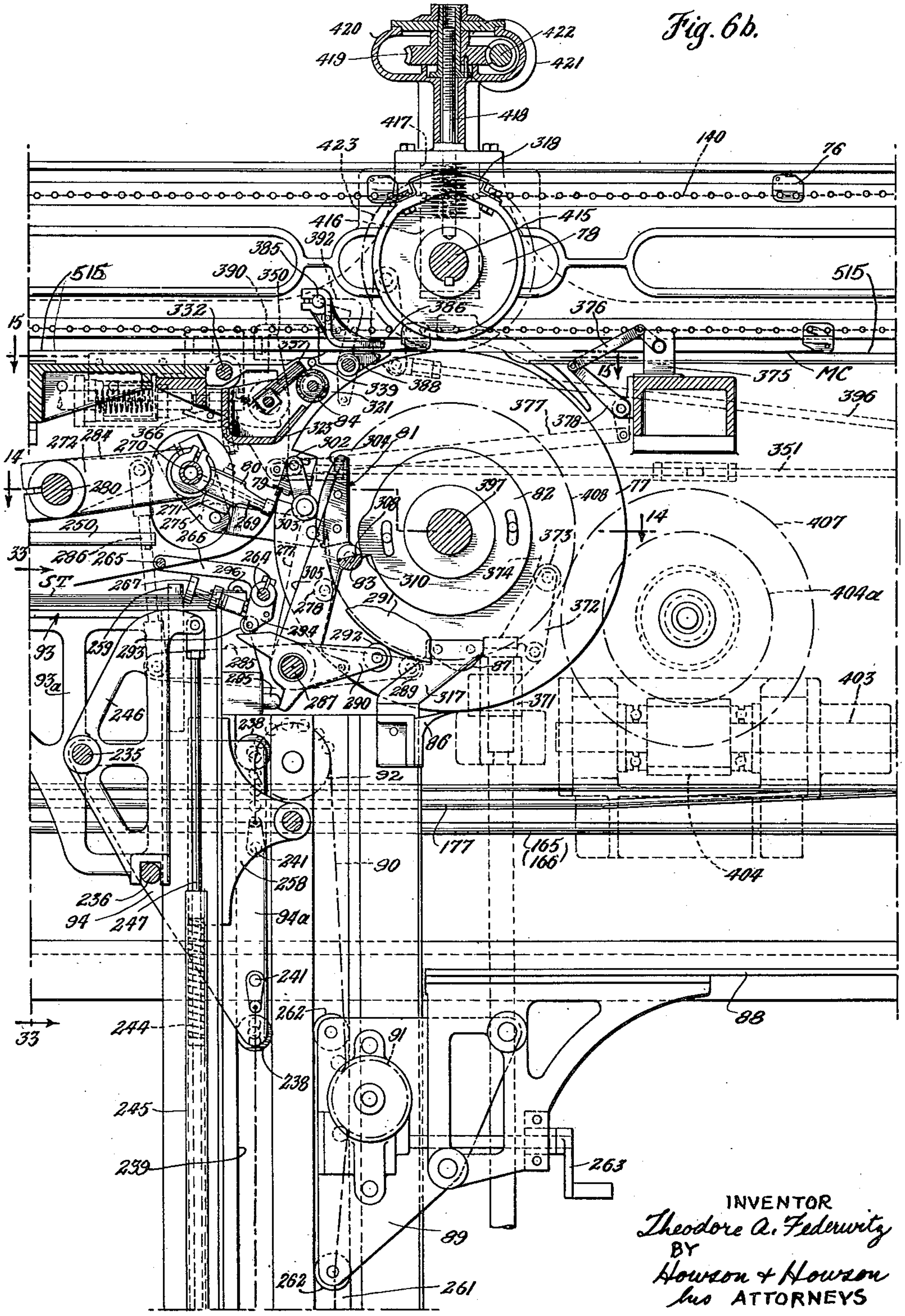
Figure 6C:
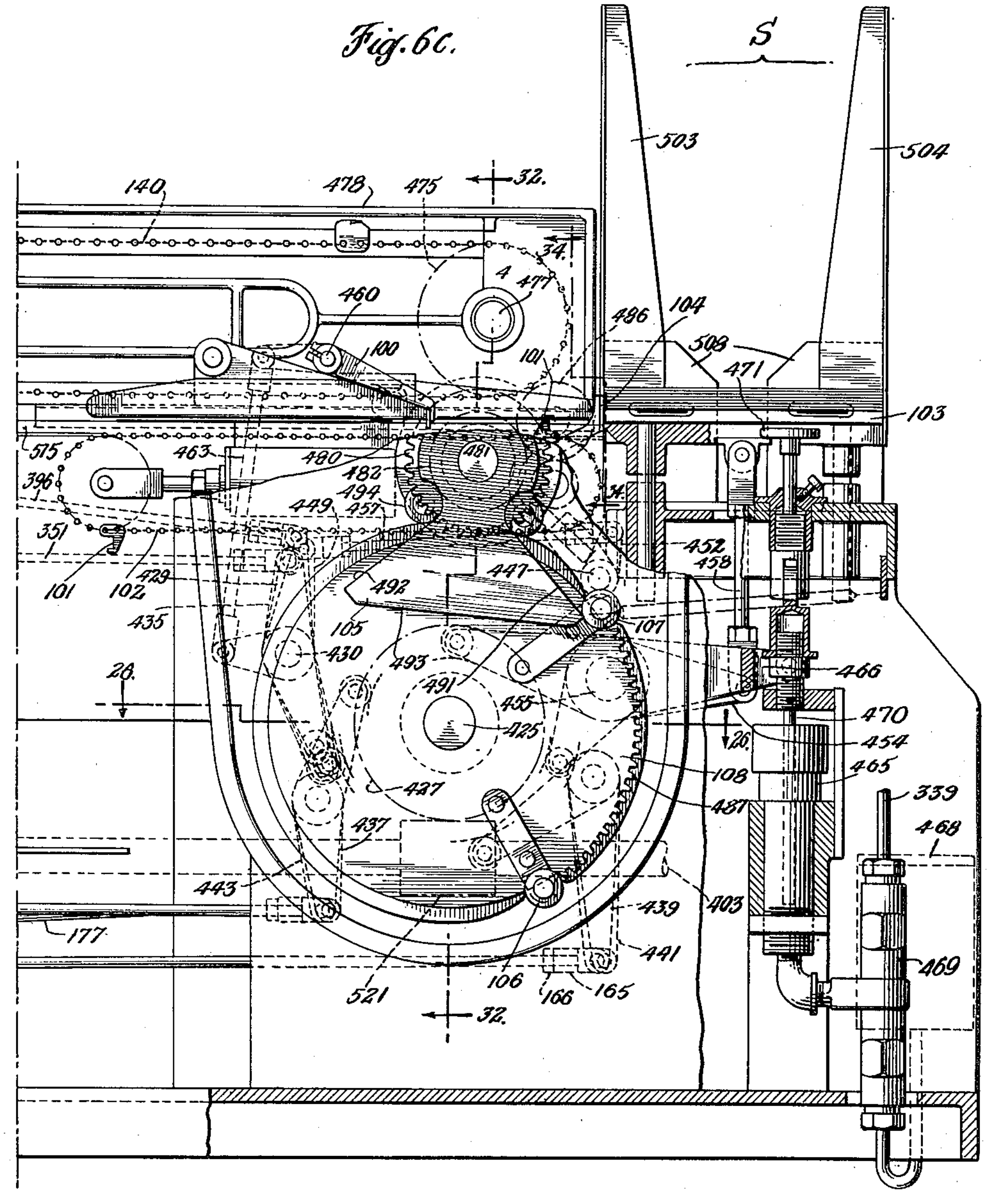
Figure 7:
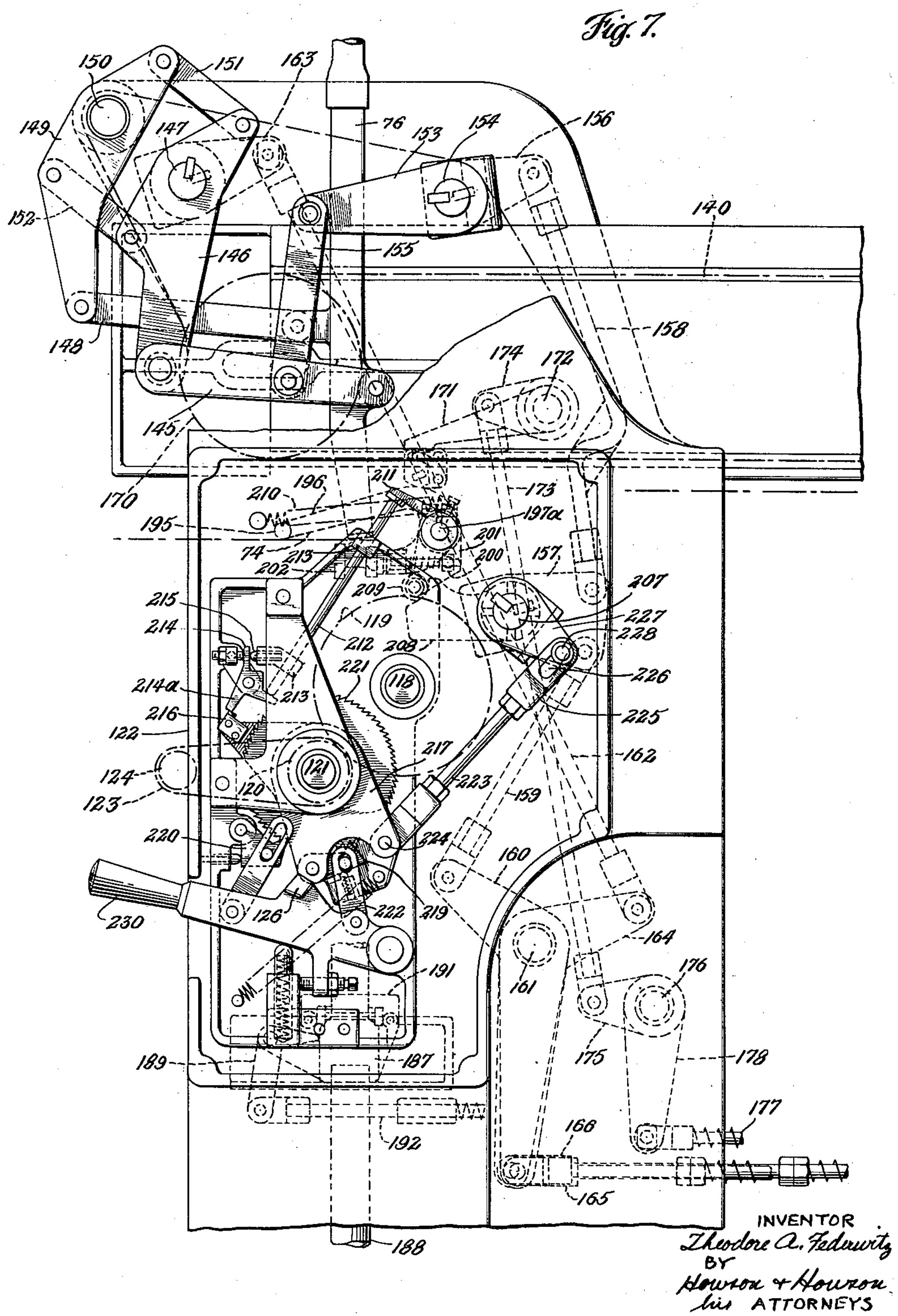
Figures 8, 9:
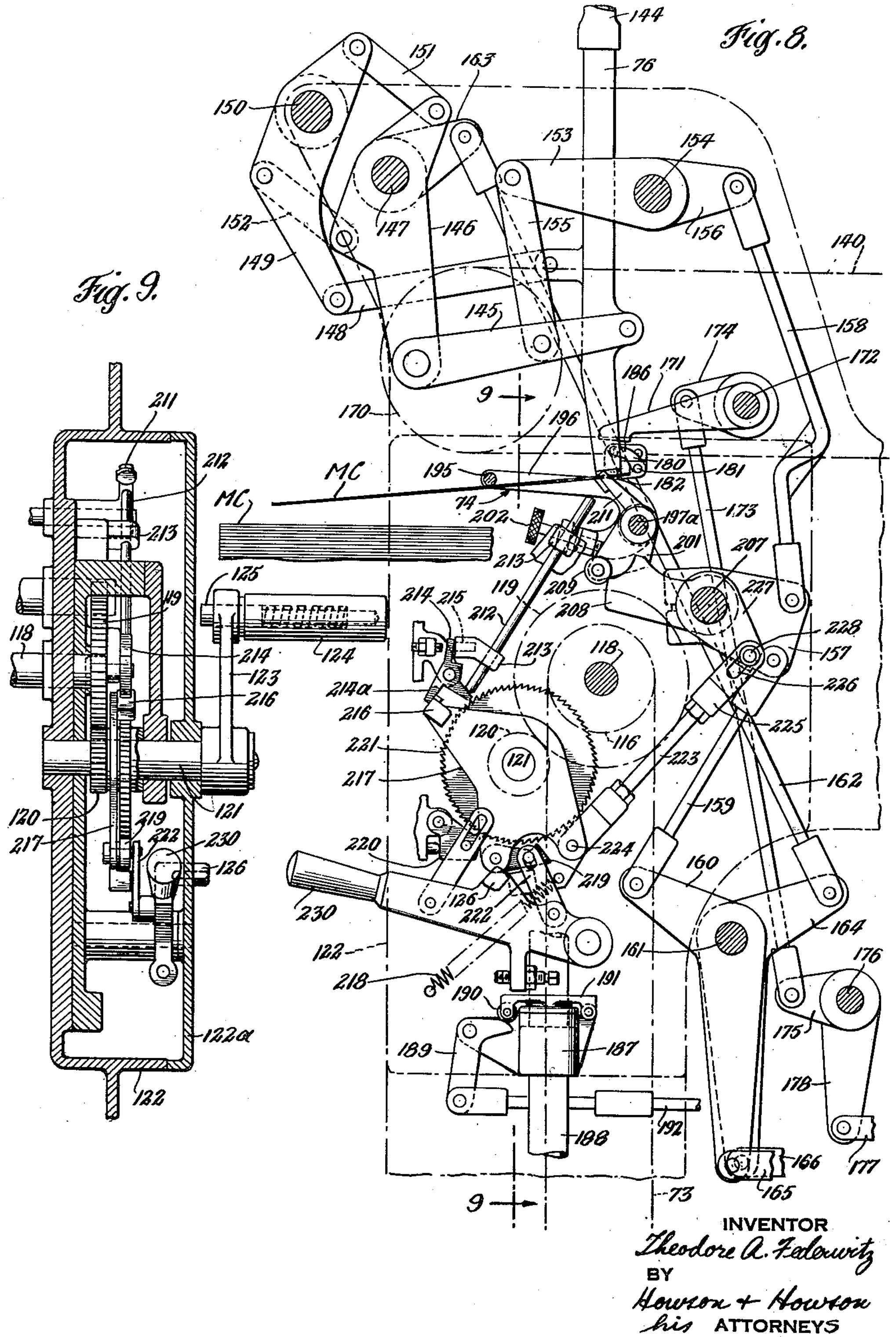
Figures 10, 11, 12:
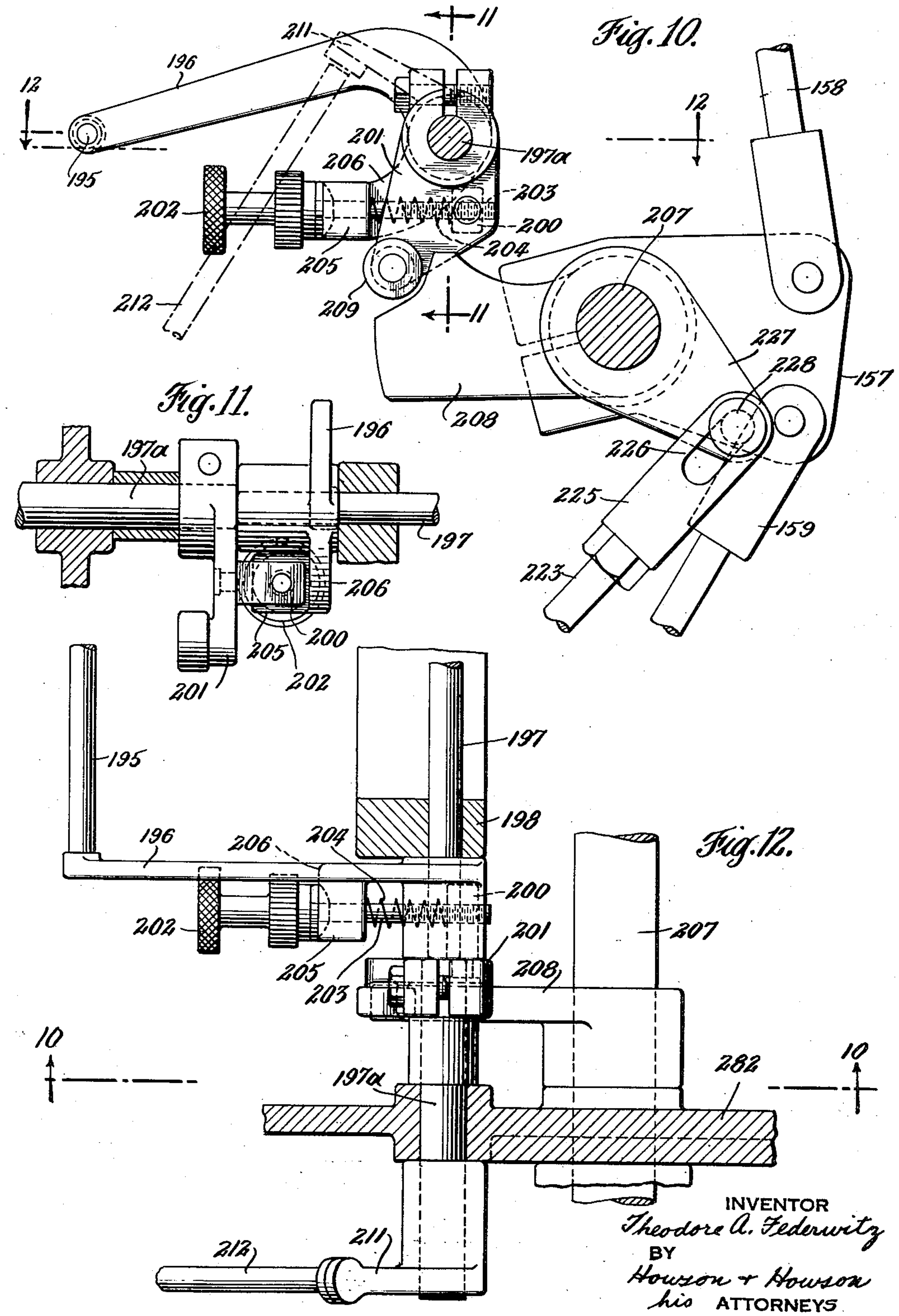
Figure 13:
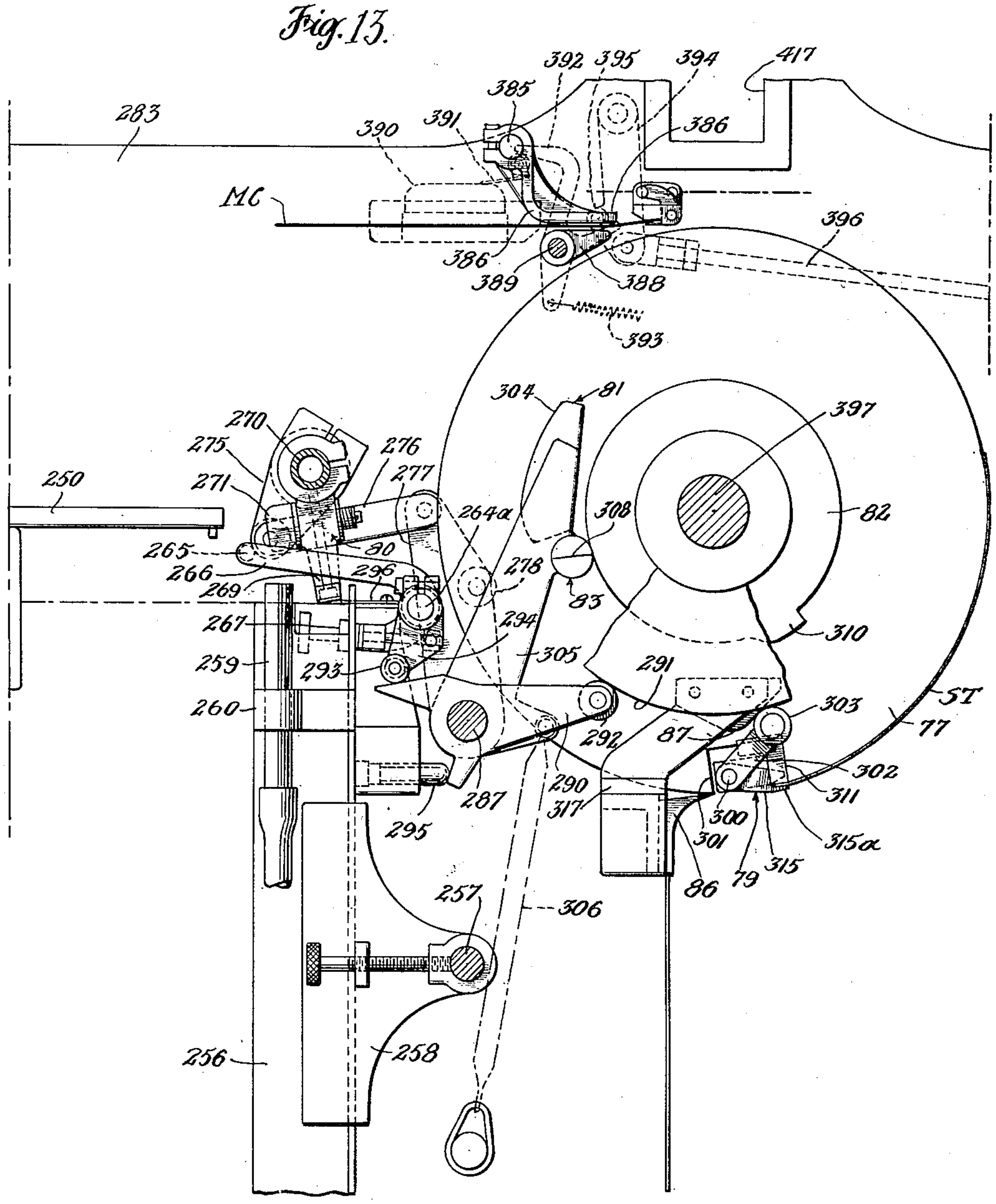
Figure 14A:
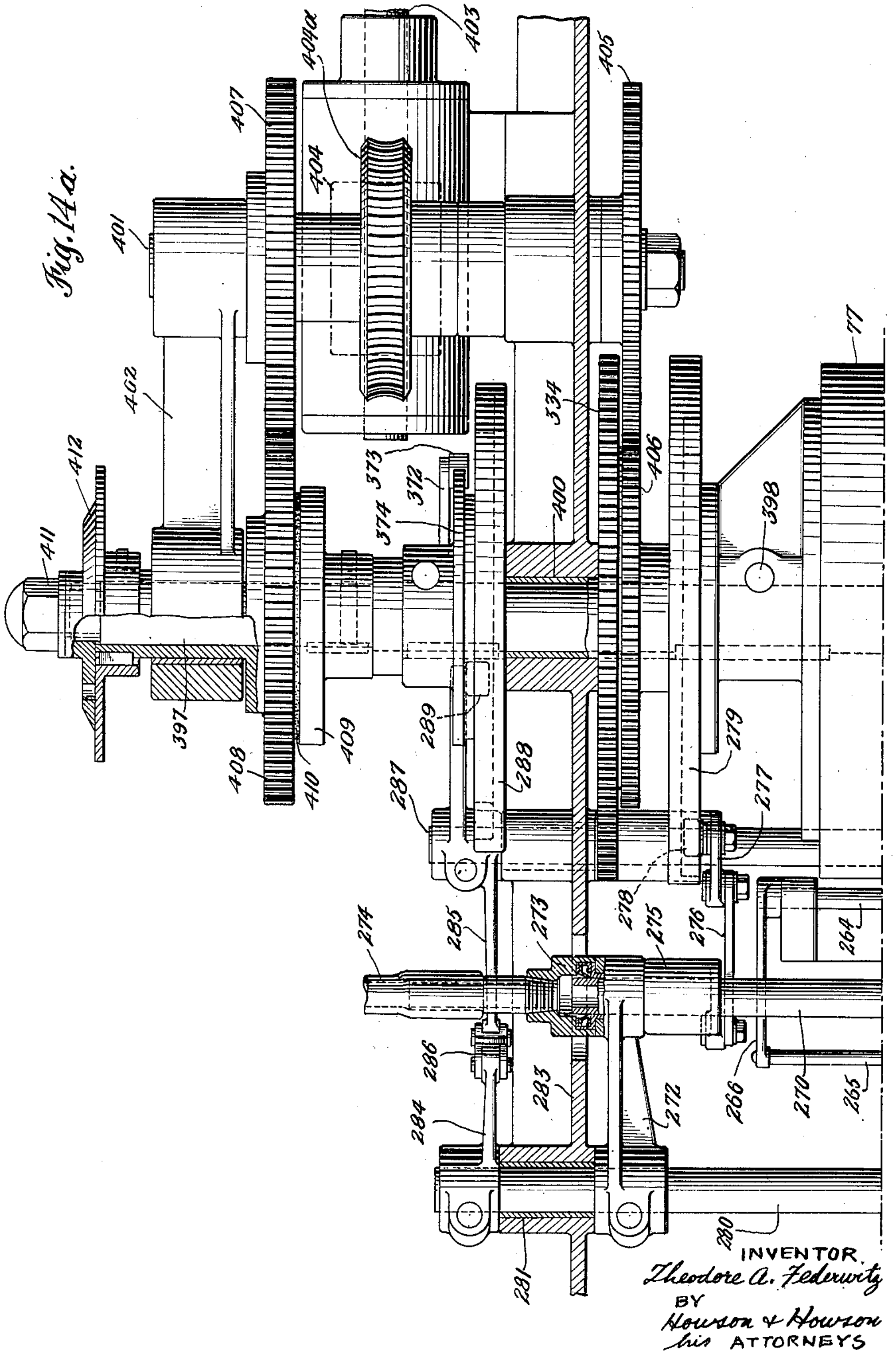
Figure 14B:
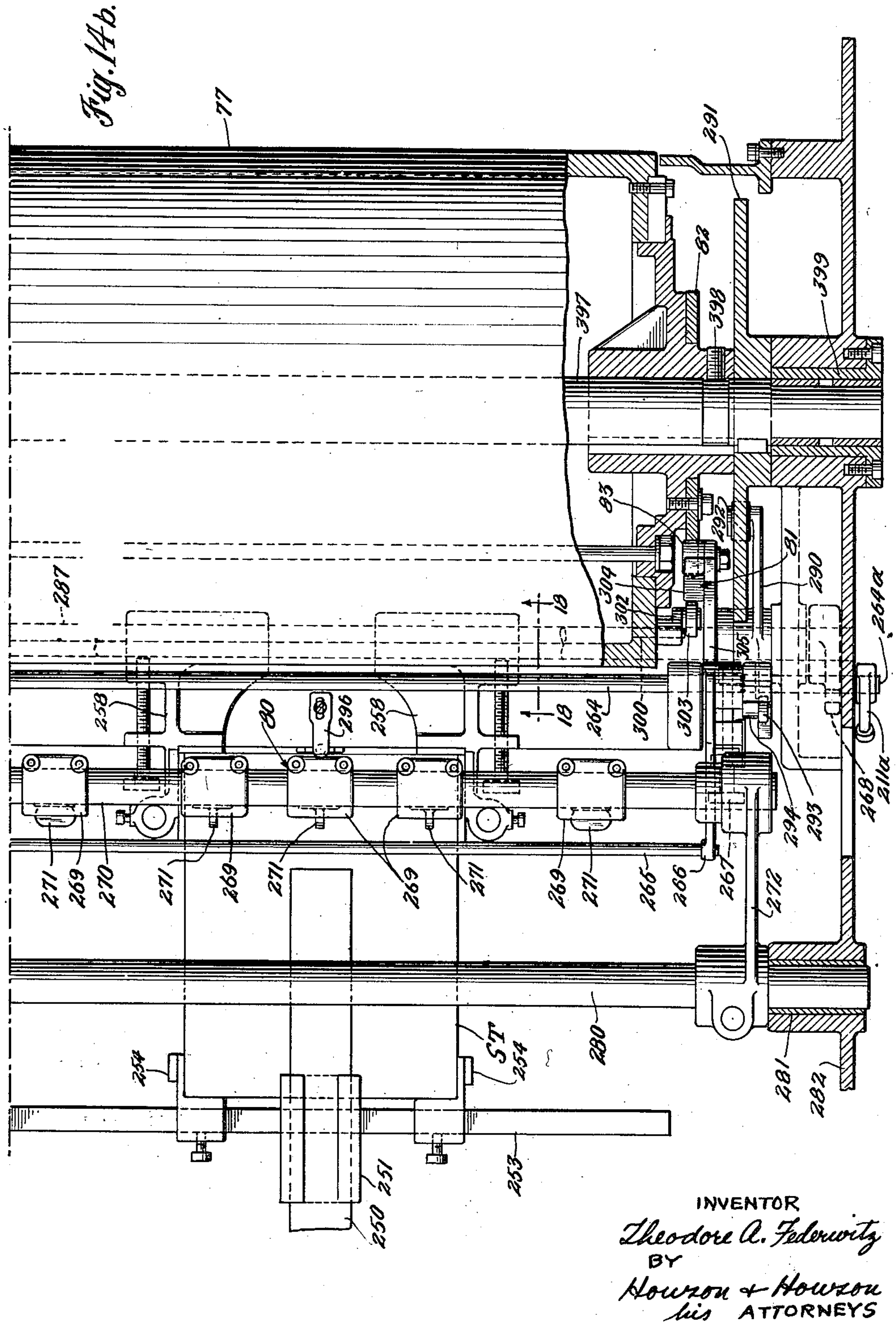
Figure 15:
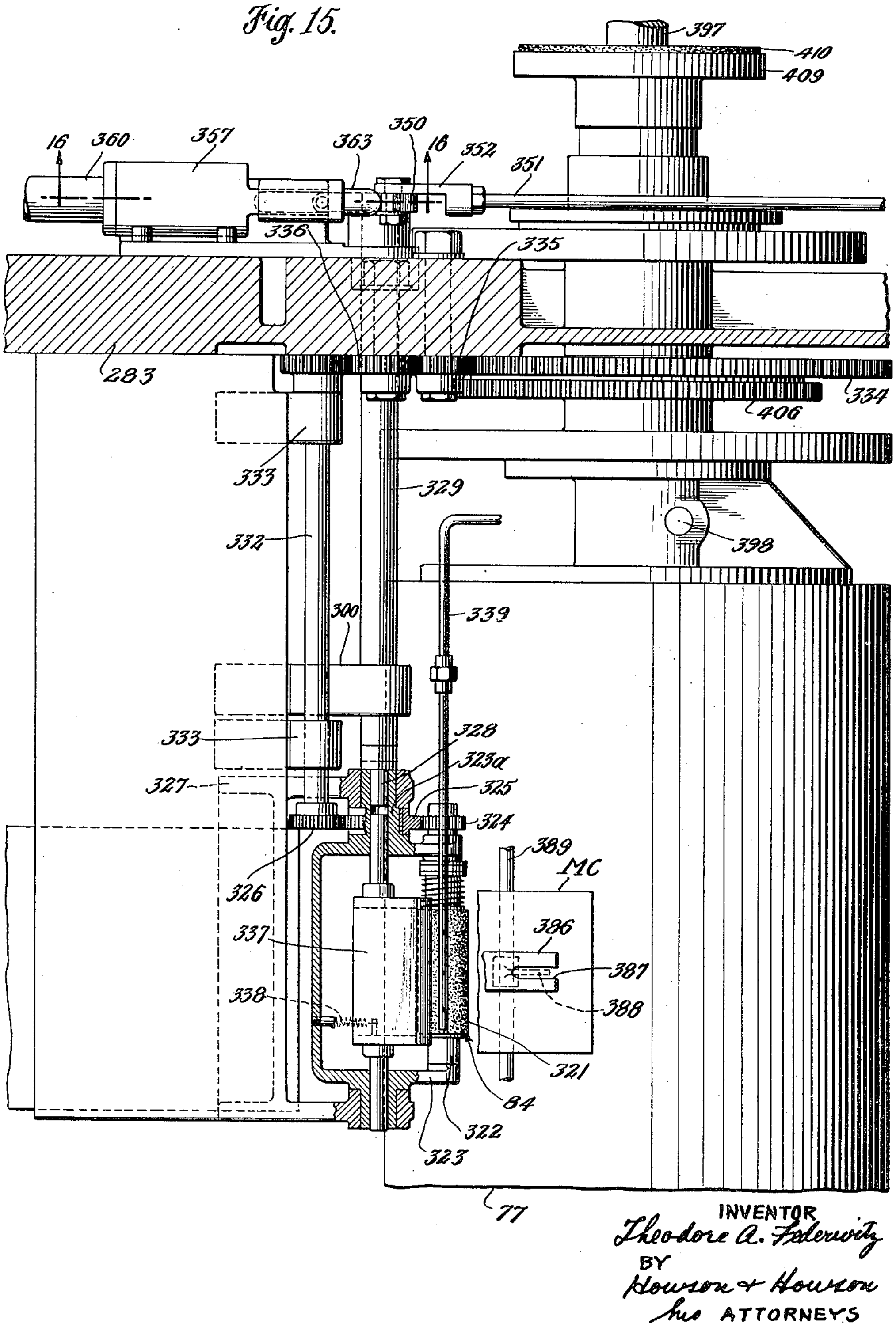
Figure 16:
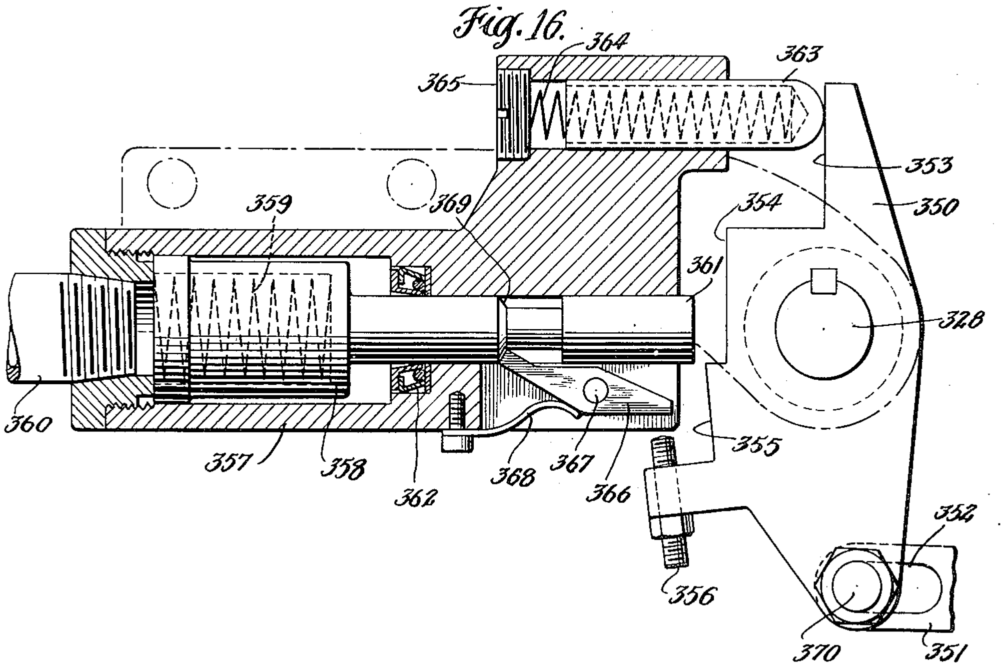
Figure 17:
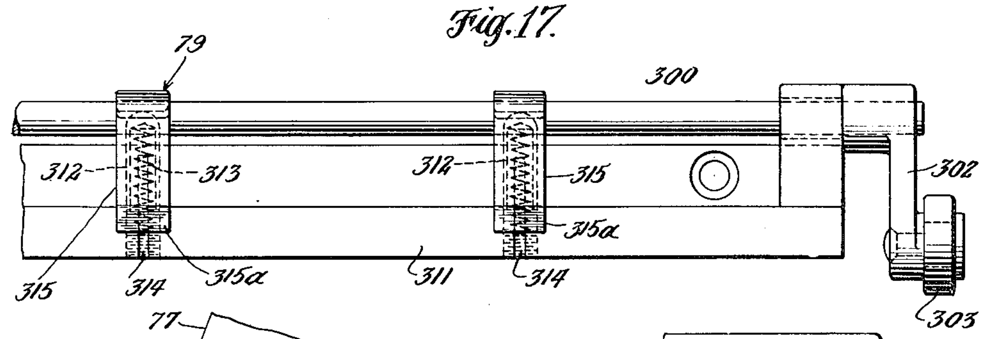
Figure 18:
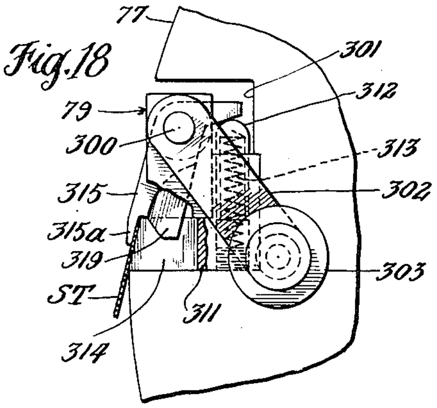
Figure 19:
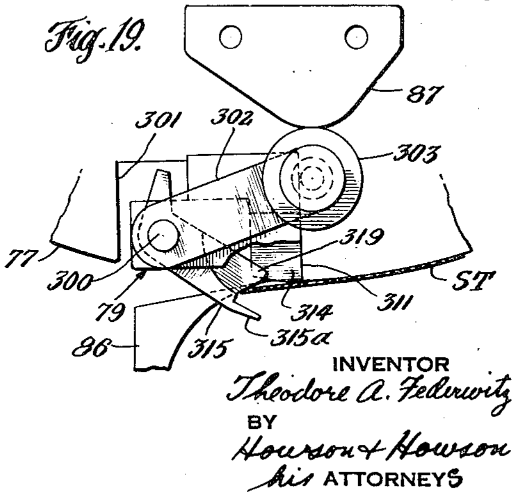
Figures 20, 21:
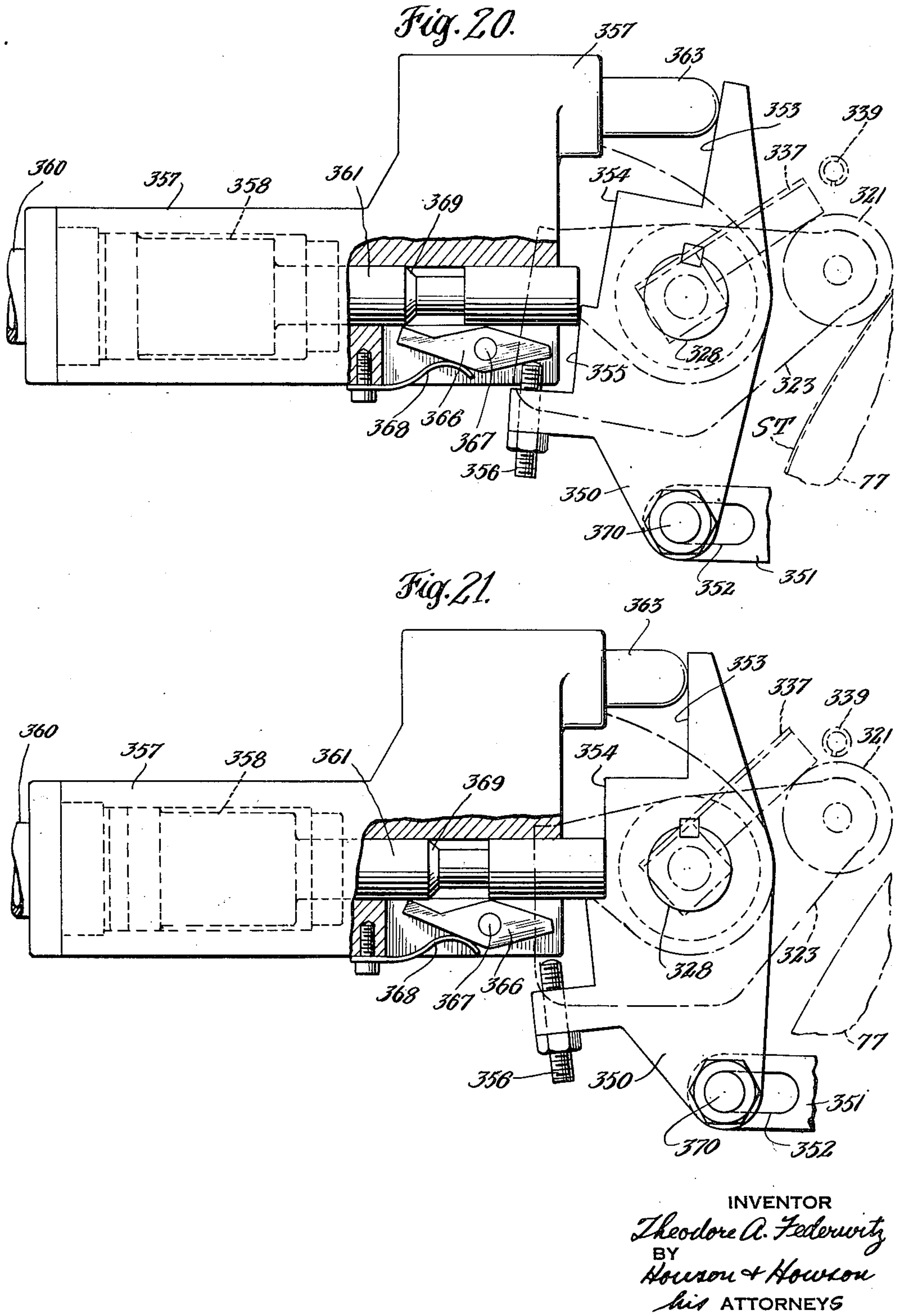
Figure 22:
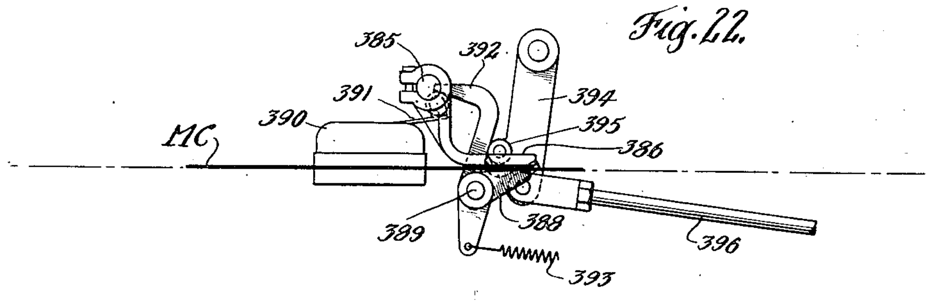
Figure 23:
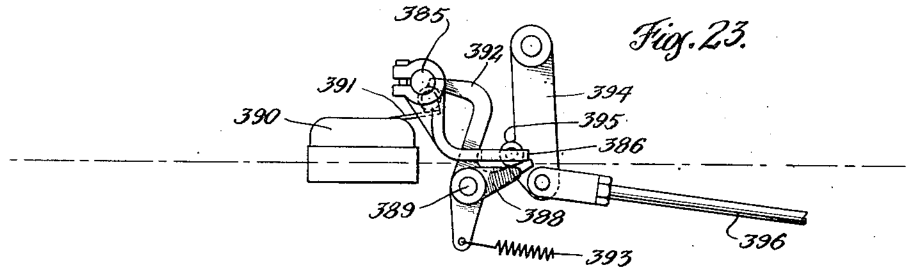
Figure 24:
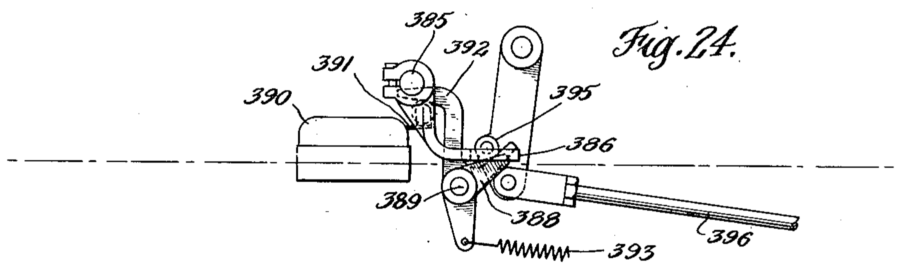
Figure 25:
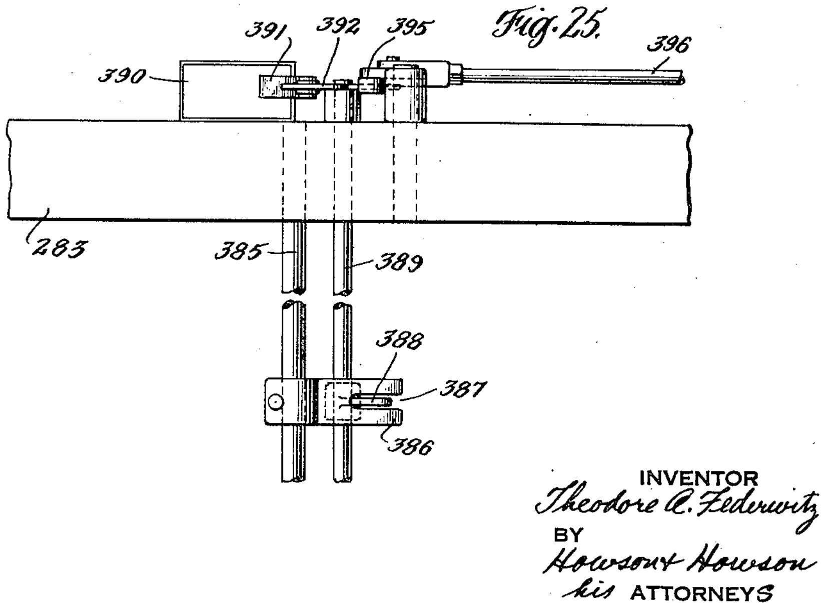
Figure 26:
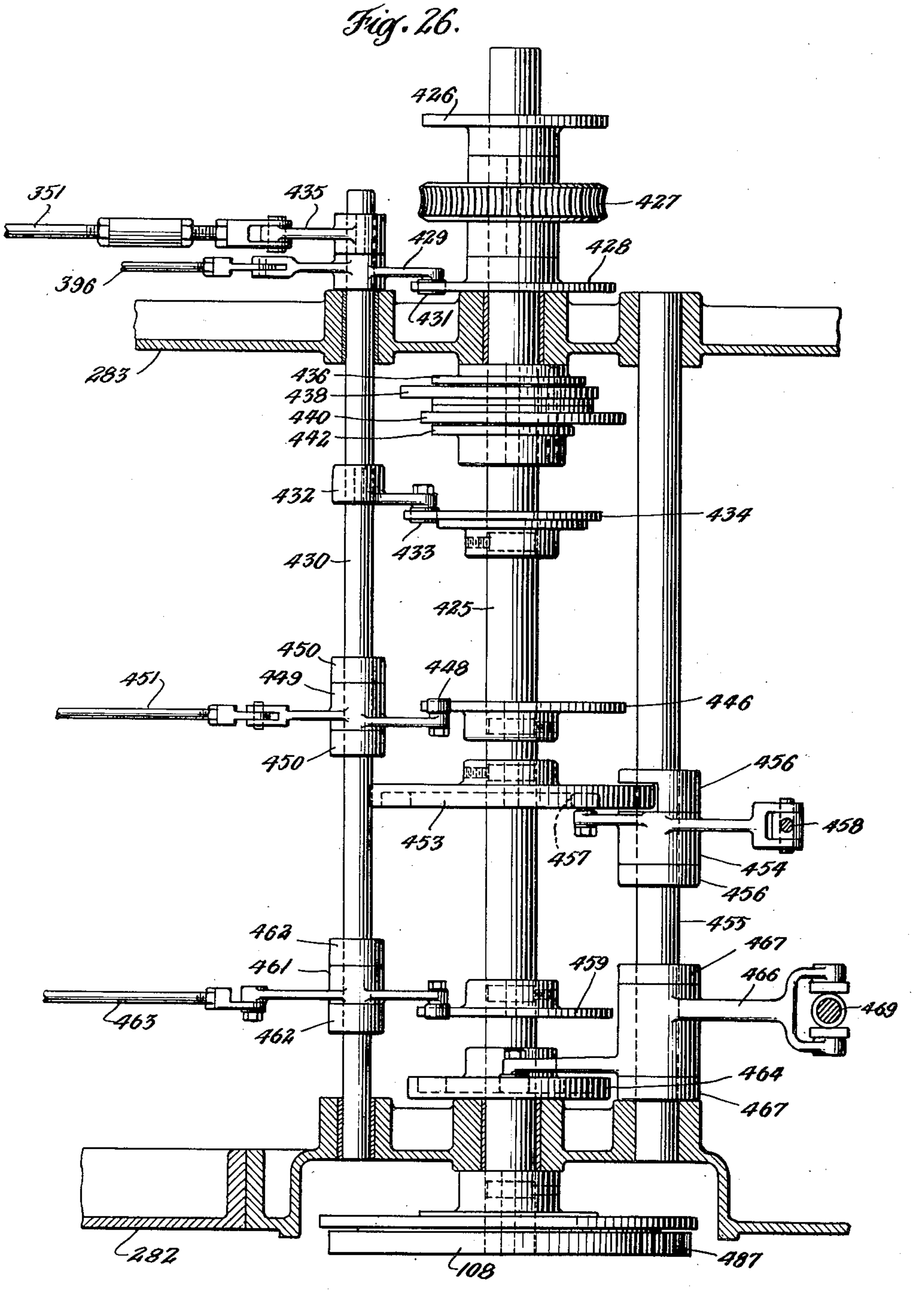
Figures 32, 33:
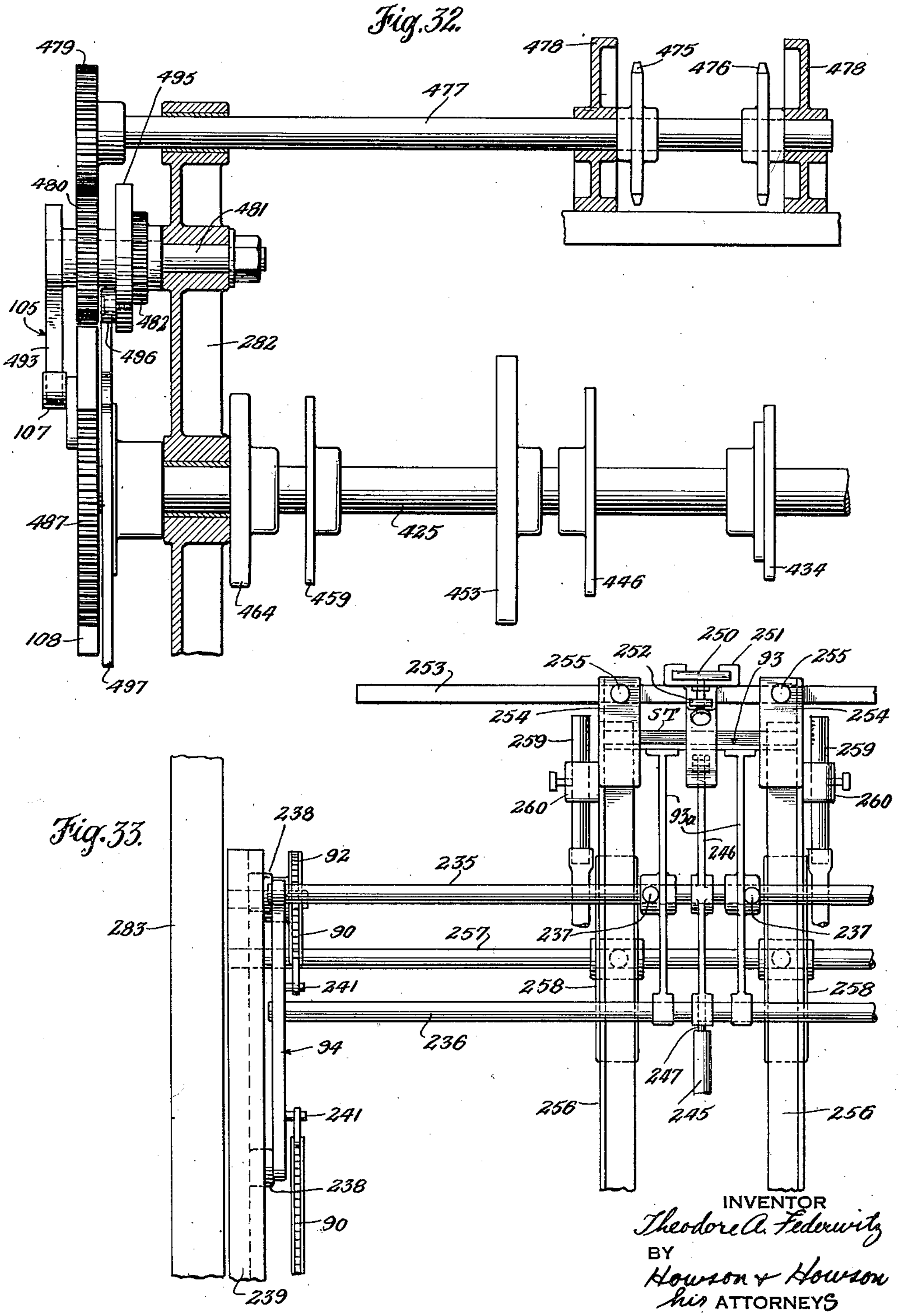
Figure 34:
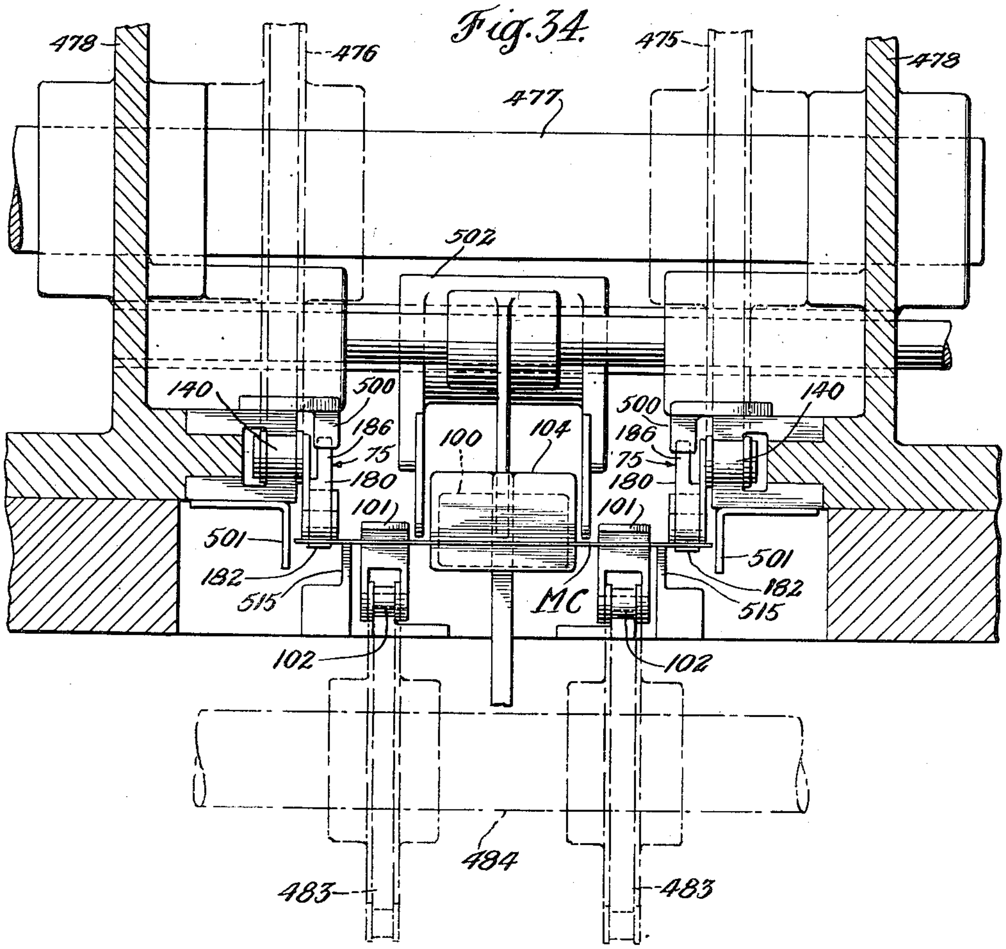
Figure 35:
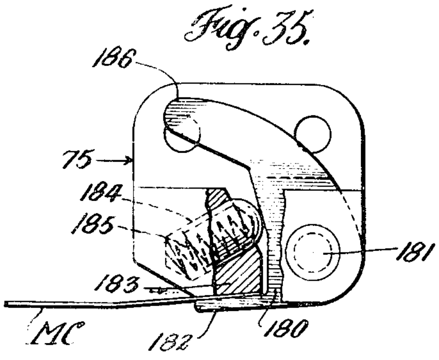
Figure 36:
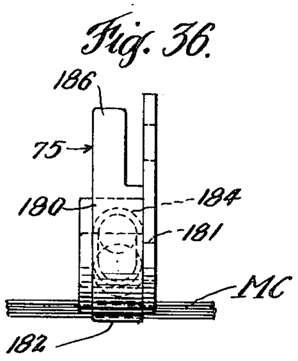
Figures 40, 41:
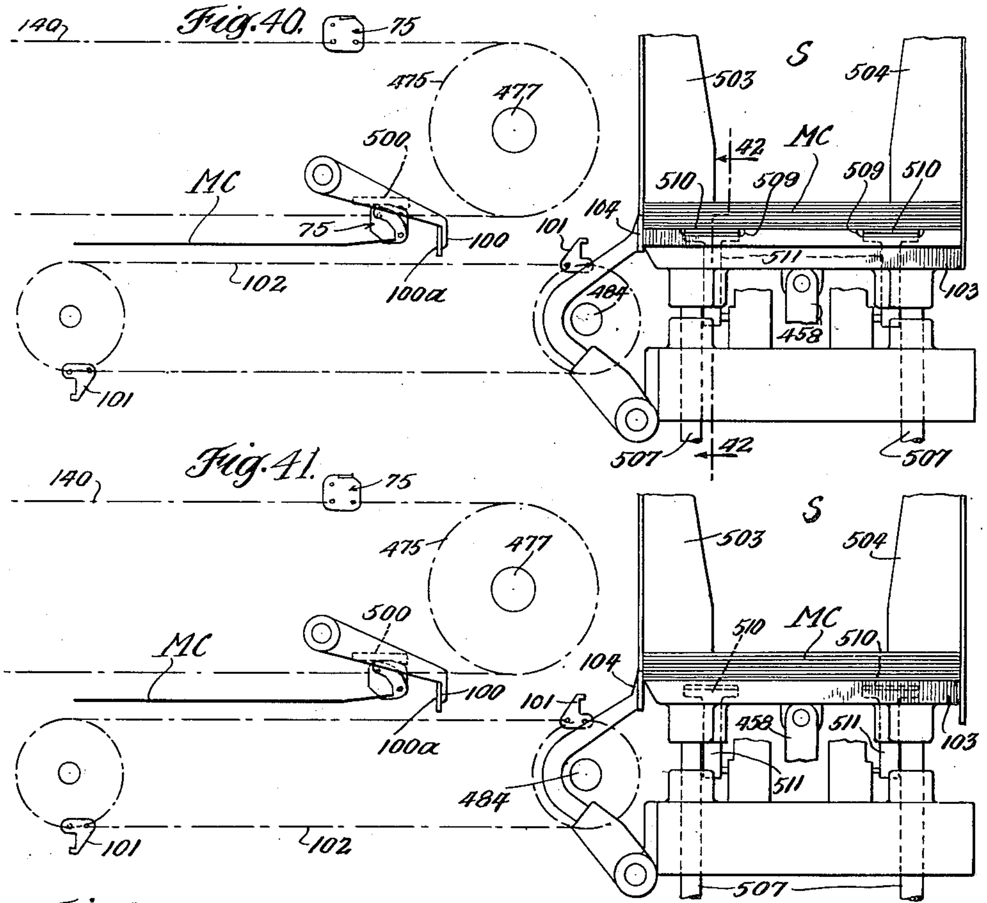
Figures 42, 43, 44:
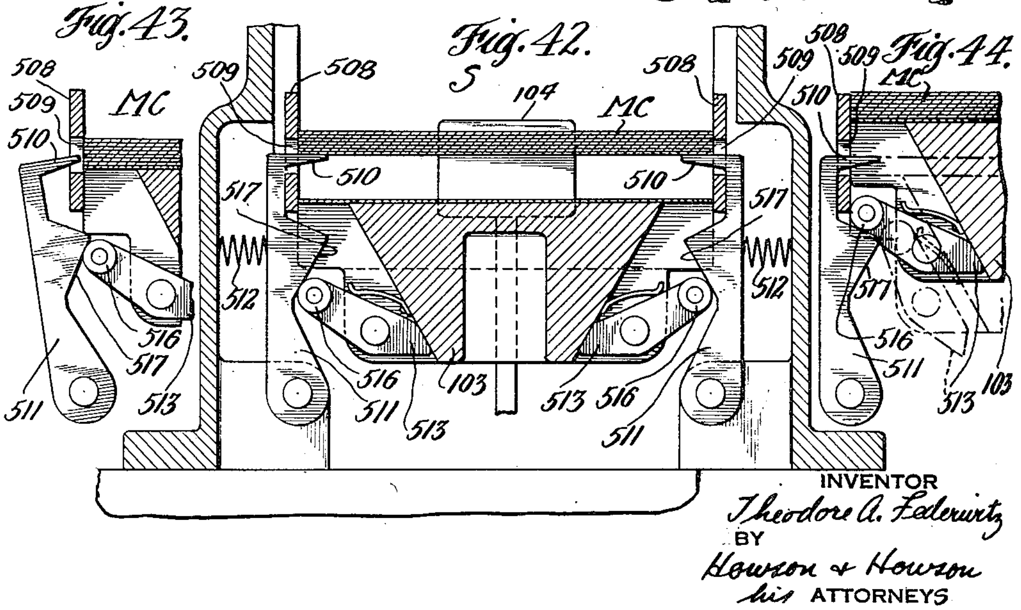
Figures 46, 47:
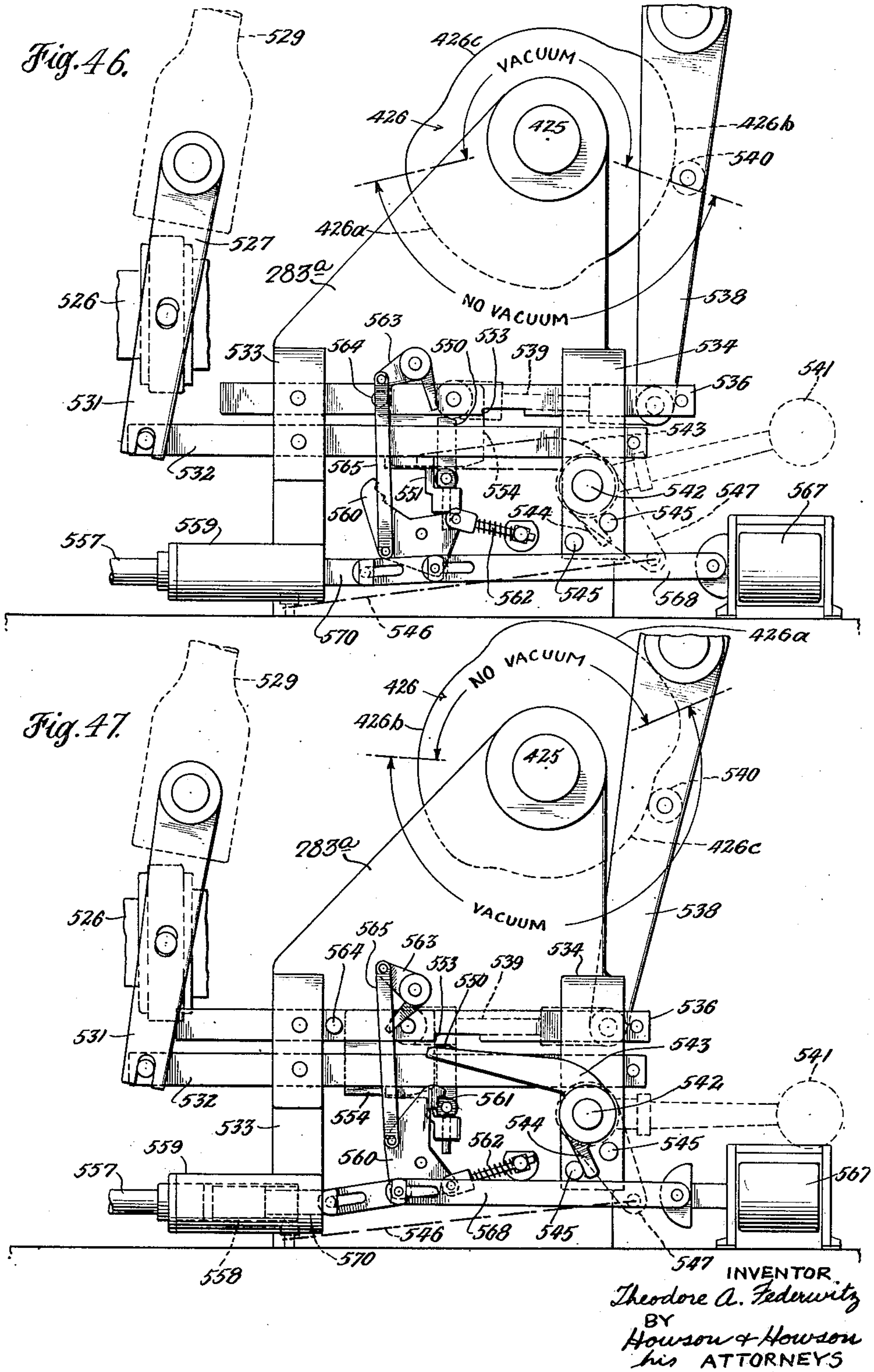
Figure 45:
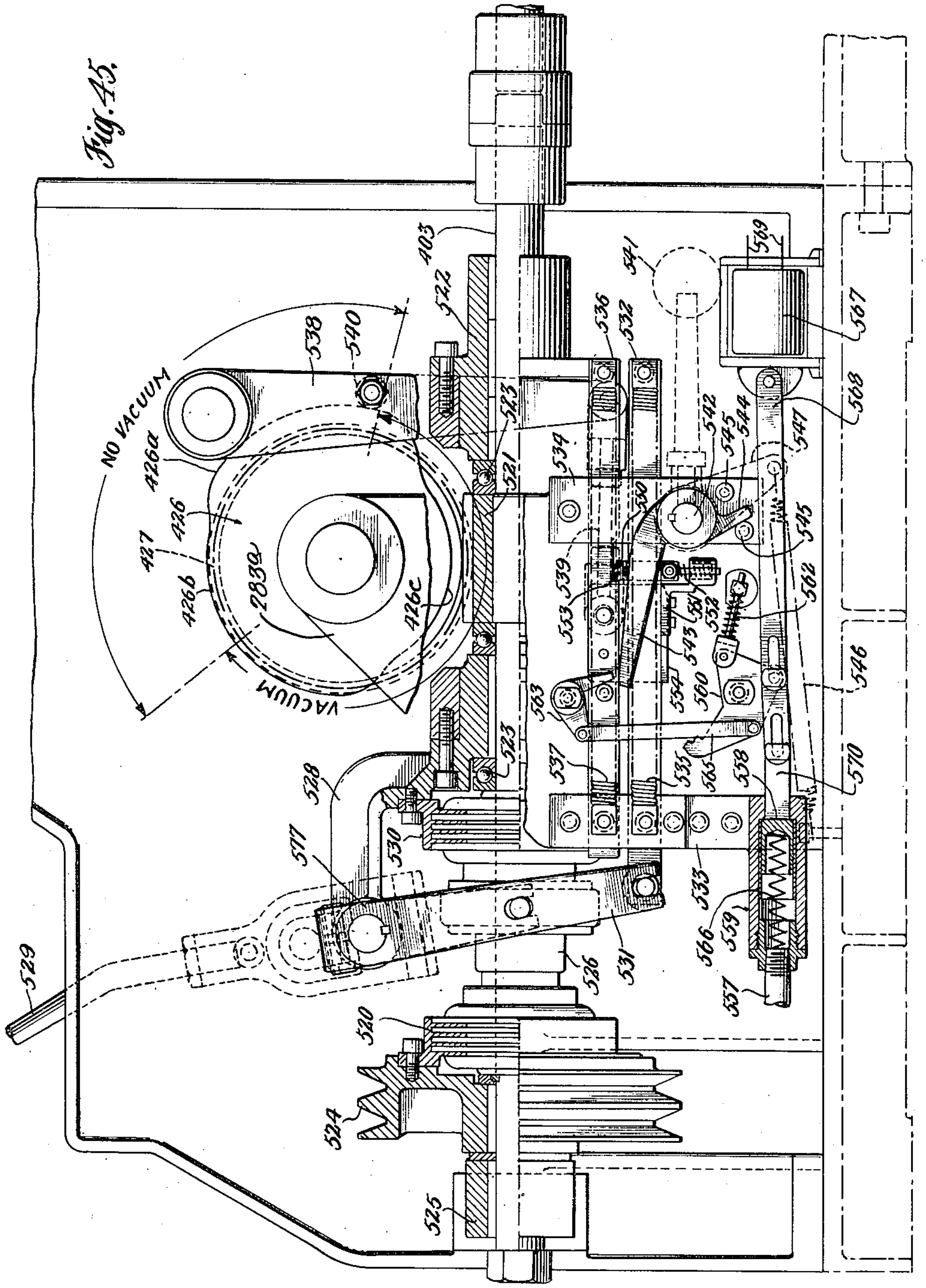
Figures 48, 49, 50:
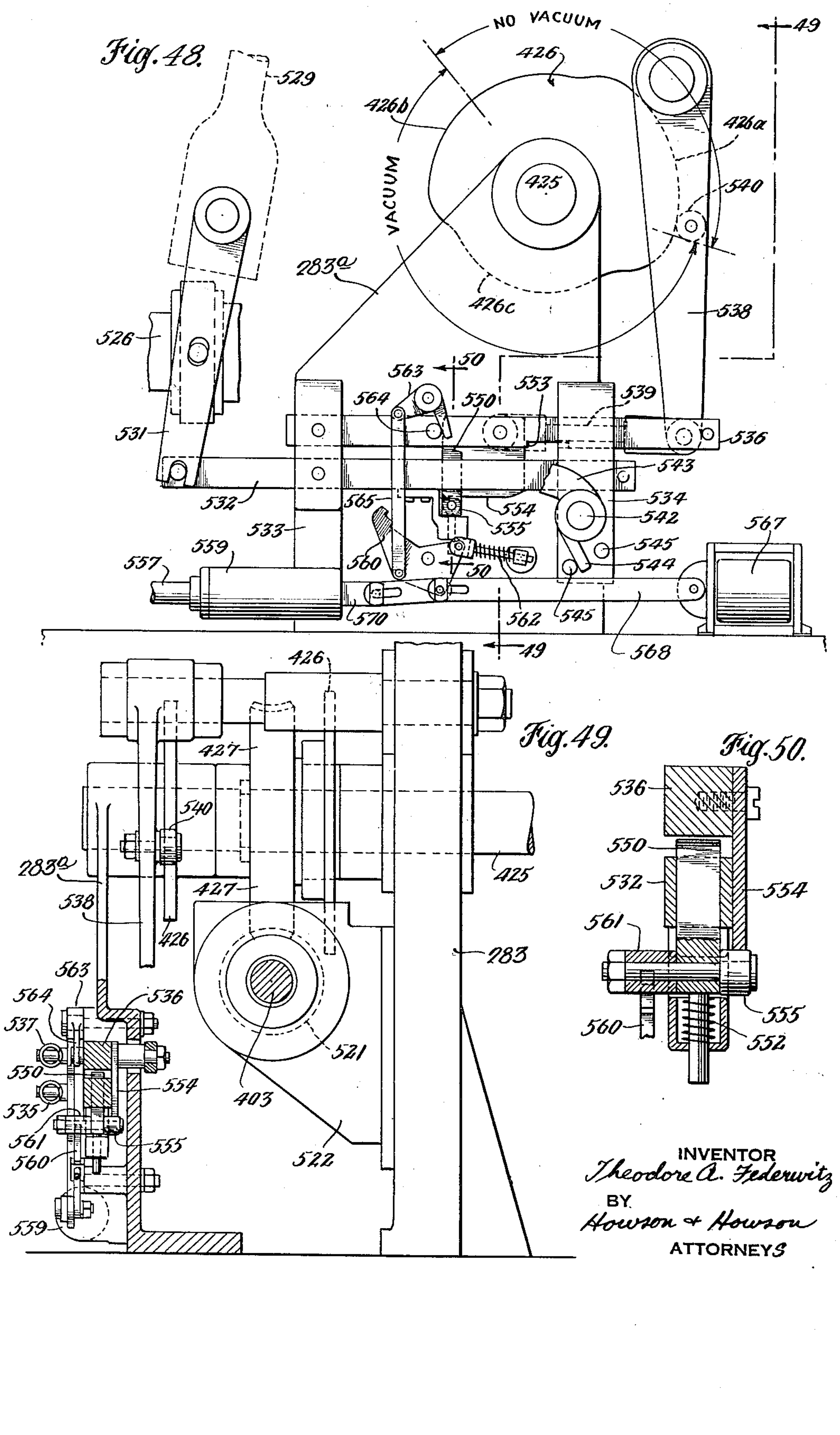
Figures 51, 52:
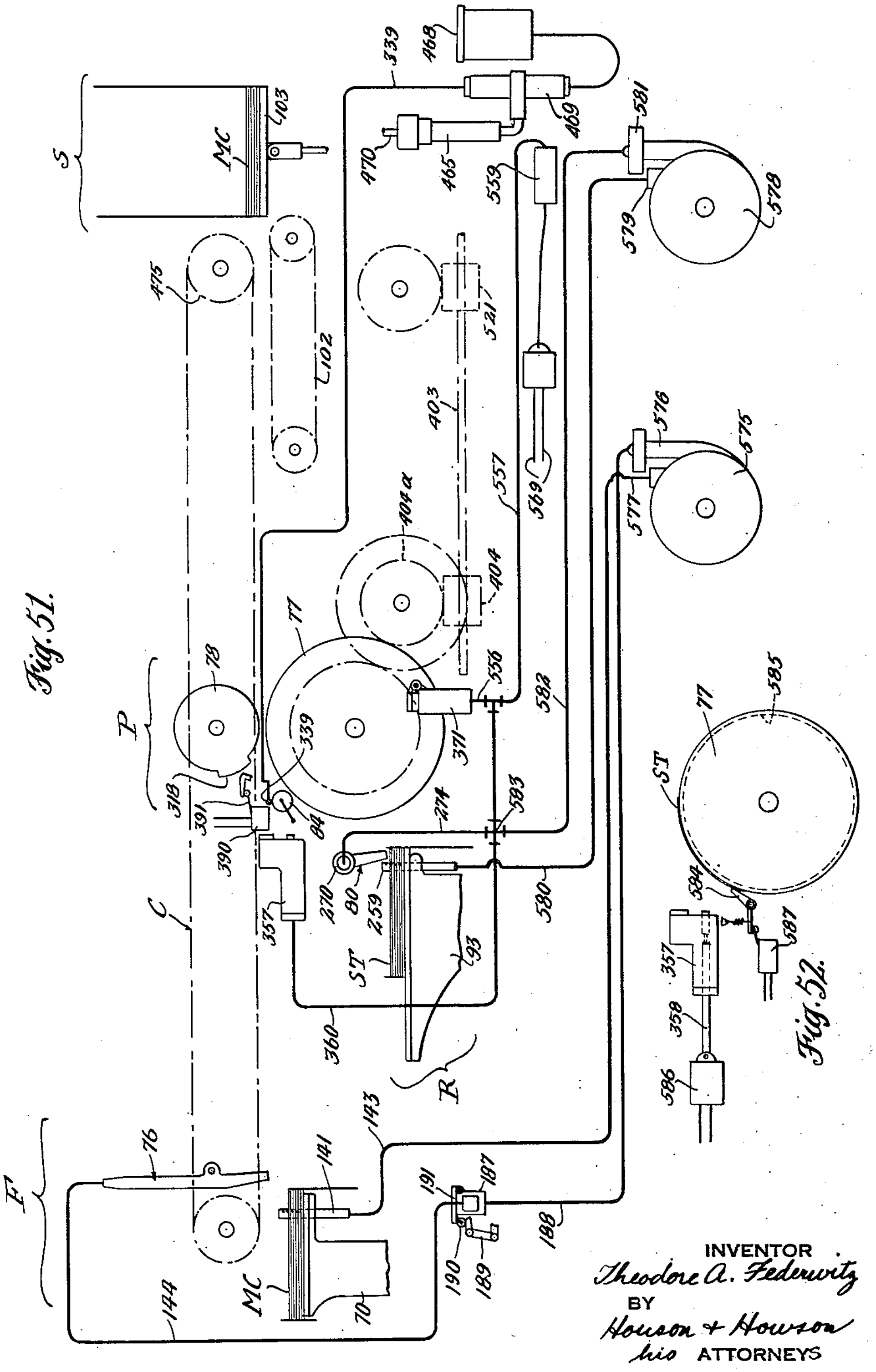
Figures 53, 54:
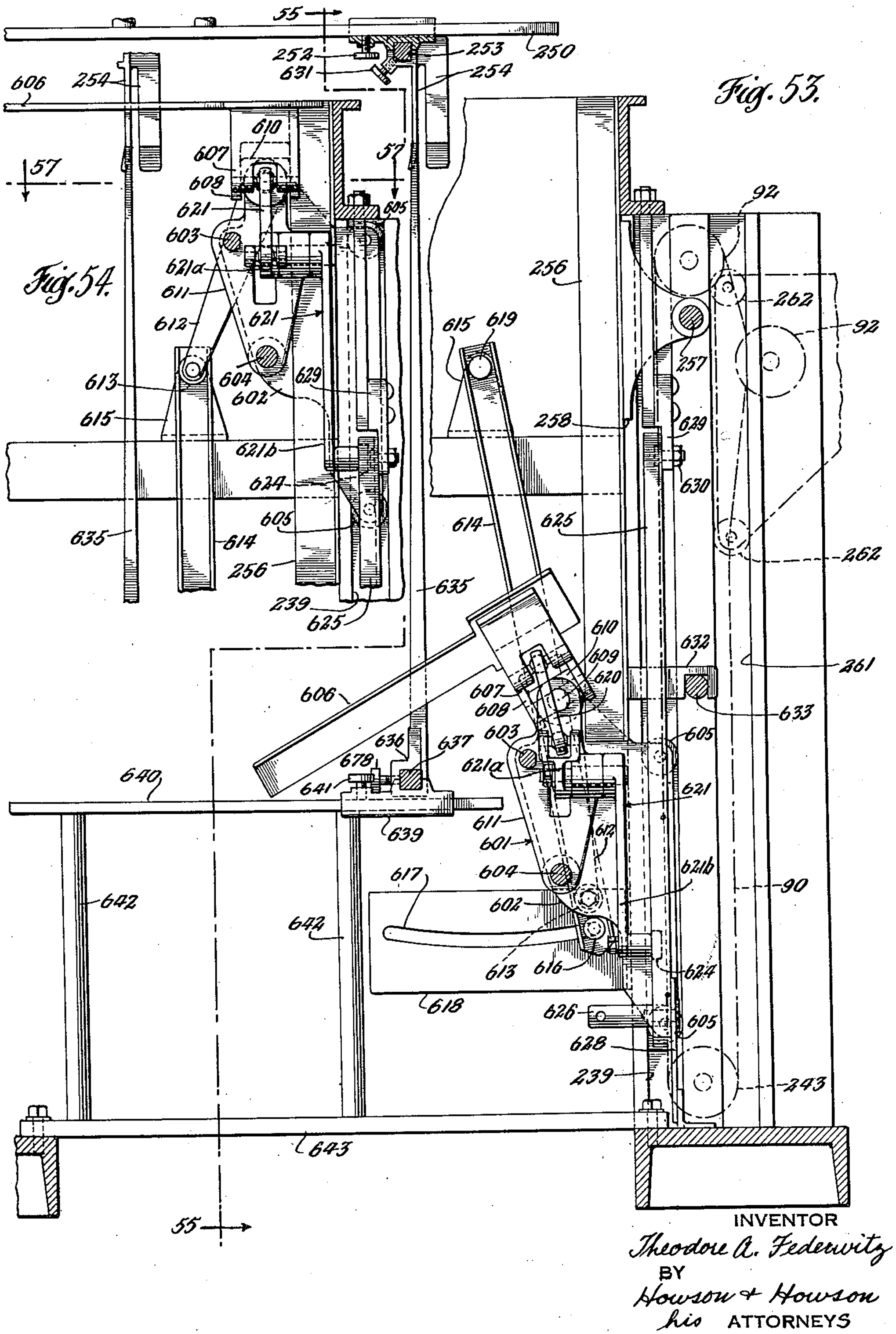
Figures 55, 56:
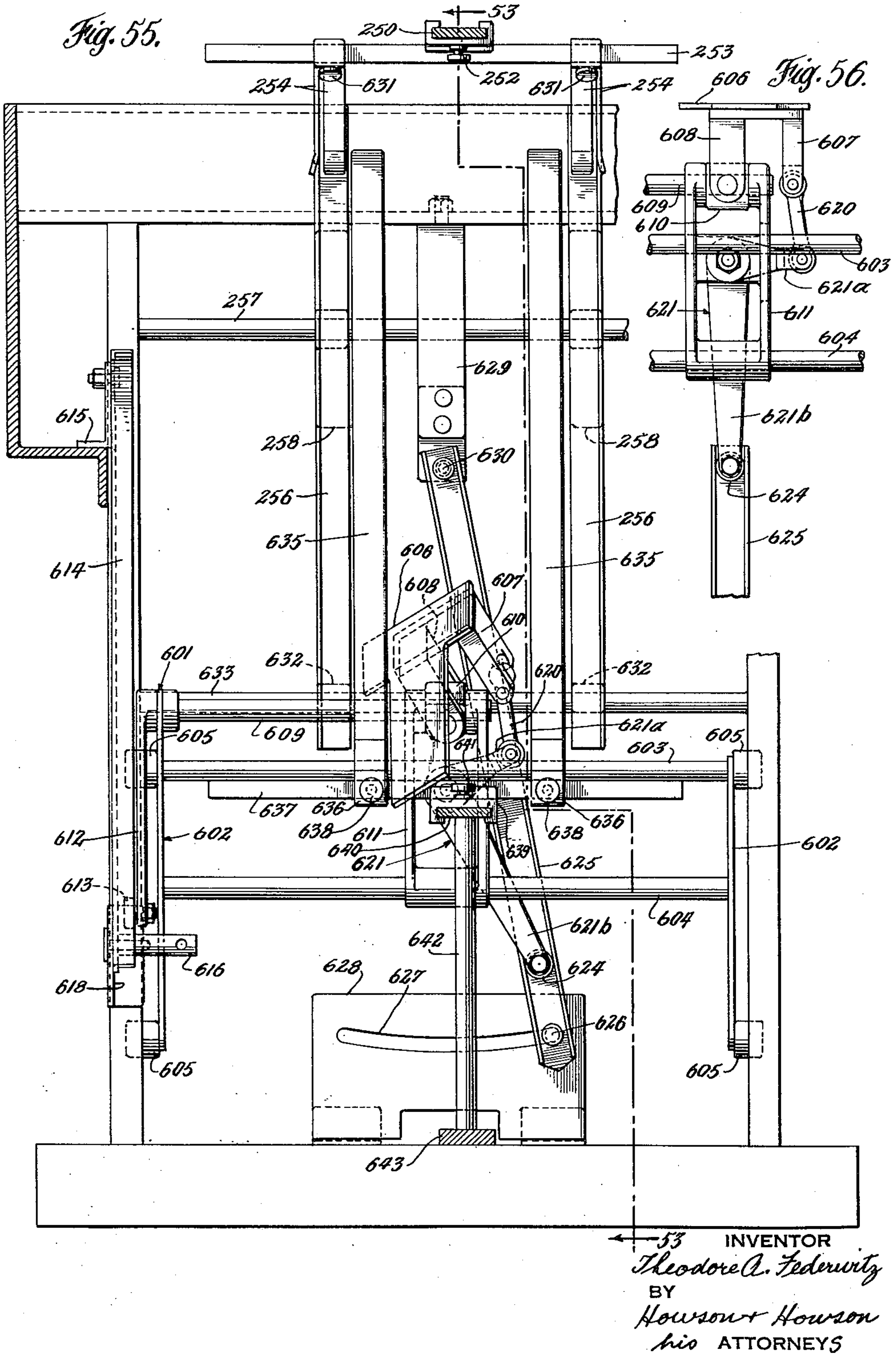
Figure 57:
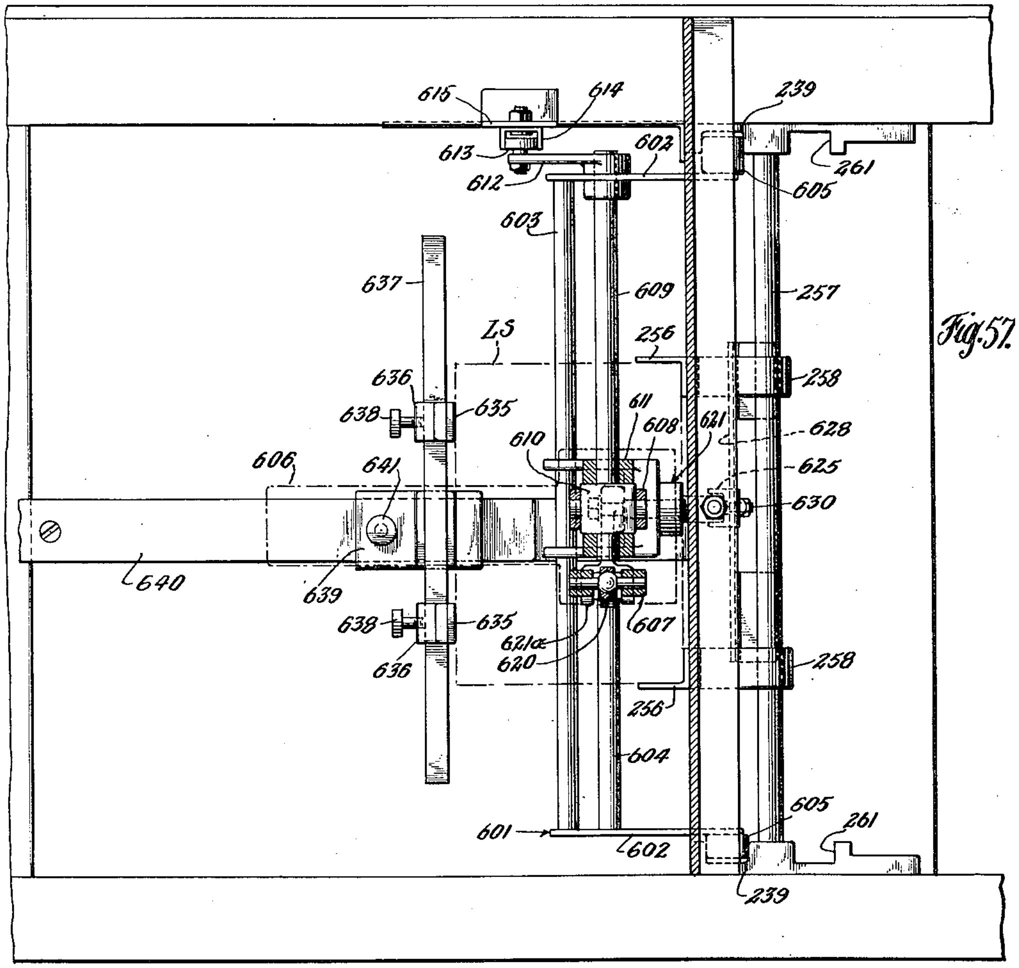
Figure 59:
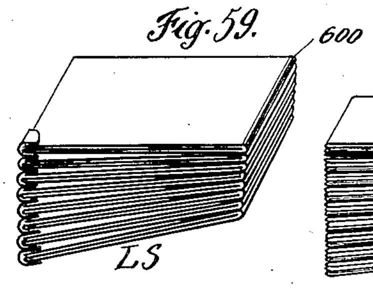
Figure 58:
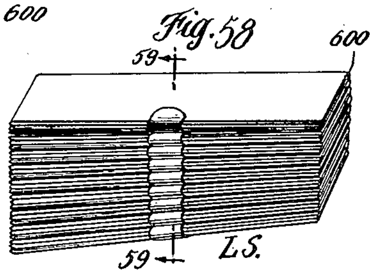
Figure 60:
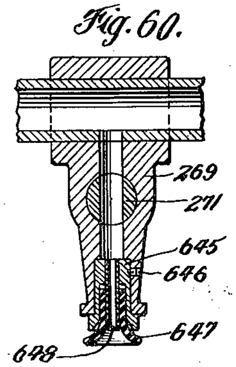
Figure 61:
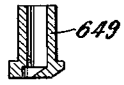

Figs. 6*a*, 6*b* and 6*c* taken together, show a longitudinal vertical section taken substantially on the line 6—6 of Fig. 3;

Fig. 7 is a fragmentary side view corresponding generally to the structure shown in Fig. 6;

Fig. 8 is a transverse sectional view similar to Fig. 7 but showing the parts in a moved position;

Fig. 9 is a sectional detail as shown at 9—9 of Fig. 8;

Fig. 10 is an enlarged sectional detail of a part of the structure of Figs. 7 and 8, showing the detector bar and actuating mechanism for the master card table feed;

Fig. 11 is a sectional detail as seen at 11—11 of Fig. 10;

Fig. 12 is a sectional top view as seen at 12—12 of Fig. 10;

Fig. 13 is an enlarged side view with some of the parts removed, corresponding generally to Fig. 6*a* and showing the drum in a different position;

Figs. 14*a* and 14*b* show an enlarged fragmentary sectioned top view of the transfer station of the machine, as seen substantially at 14—14 of Fig. 6*a*;

Fig. 15 is an enlarged sectional top view as seen at 15—15 of Fig. 6*a*;

Fig. 16 is an enlarged sectional detail showing a preferred form of the automatic latch for the moistener roll, as seen at 16—16 of Fig. 15;

Fig. 17 is a fragmentary detail showing the drum grippers and their actuating mechanism;

Fig. 18 is a fragmentary sectional detail as seen substantially at 18—18 of Fig. 14*b*;

Fig. 19 shows the gripper of Fig. 18 in a discharge position;

Fig. 20 is a side view partly broken away, of the structure of Fig. 16 with the parts in a moved position;

Fig. 21 shows the mechanism of Fig. 20 in a locked position;

Figs. 22–24 are fragmentary details of the safety detector for the master cards in various moved positions;

Fig. 25 is a fragmentary top view of the structure of Figs. 22–24;

Fig. 26 is a sectional top view as seen substantially at 26—26 of Fig. 6*c*;

Fig. 27 is a side view showing the conveyer chain drive structure of Fig. 6*c* in a moved position;

Fig. 28 is a view similar to Fig. 27 but showing only the cam plates;

Figs. 29 and 30 correspond to Figs. 27 and 28 but with the structure in a moved position;

Fig. 31 is a fragmentary detail of the cam plates in the locked position of Fig. 6*c*;

Fig. 32 is a fragmentary transverse sectional detail of the conveyer drive as seen at 32—32 of Fig. 6*c*;

Fig. 33 is a fragmentary detail showing an end view of the sheet feed table as seen at 33—33 of Fig. 6*b*;

Fig. 34 is an enlarged sectional detail substantially as seen at 34—34 of Fig. 6*c*;

Fig. 35 is an enlarged detail of one of the conveyer grippers shown in Fig. 6*b*;

Fig. 36 is an end view of the structure of Fig. 35;

Figs. 37–41 are schematic views showing the progressive positions of the stacker and the stacker feed;

Fig. 42 is an enlarged sectional detail as seen at 42—42 of Fig. 40;

Figs. 43 and 44 are sectional details of the structure of Fig. 42 showing the stacker dogs and table in moved positions;

Fig. 45 is a side view partly sectioned, showing the main drive and safety clutch mechanism;

Figs. 46–48 illustrate different positions of certain parts of the clutch mechanism of Fig. 45;

Fig. 49 is a sectional detail on an enlarged scale as seen at 49—49 of Fig. 48;

Fig. 50 is an enlarged fragmentary sectional detail as seen at 50—50 of Fig. 48;

Fig. 51 is a schematic view showing the various pneumatic and electrical control circuits;

Fig. 52 is a diagrammatic detail showing a modified form of moistener roll control used in place of the structure of Fig. 20;

Fig. 53 is a fragmentary longitudinal section showing a modified compensating table for the sheet feed structure of Figs. 6*a* and 6*b*;

Fig. 54 is a view of the upper part of the structure of Fig. 53 but with the table elevated;

Fig. 55 is a fragmentary transverse section of the duplicator as seen at 55—55 of Fig. 53;

Fig. 56 is a fragmentary detail of the upper part of the structure of Fig. 55 showing the table elevated to the position of Fig. 54;

Fig. 57 is a fragmentary top view as seen at 57—57 of Fig. 54;

Fig. 58 is a perspective showing a stack of leaflets ready to be run through the duplicating machine;

Fig. 59 is a transverse sectional view as seen at 59—59 of Fig. 58, showing the non-uniform height of the stack;

Fig. 60 is a fragmentary sectional detail of a suction nozzle of the type used in the suction head assembly; and Fig. 61 shows a replaceable tip for the nozzle of Fig. 60.

The present invention is directed specifically to a machine suitable for addressing letterheads, envelopes and mail wrappers. In previous machines used for this purpose, the master cards were conveyed from one station to another by means of rollers and conveyer belts. This expedient had the inherent disadvantage of smearing and damaging the cards. Due to the fact that the width of the belts could not be controlled accurately and also the fact that it was necessary to eject the cards from the belt and rollers with considerable force against a stop, the cards soon became so frayed and worn after several runs that the machine jammed and/or new cards had to be made.

My improved duplicator eliminates the above objections by utilizing two conveyer chains for the master cards which carry transversely spaced grippers positioned to securely engage only the corners of the master cards. The conveyer chains are intermittently actuated so that the master cards can be fed from the supply stack to each pair of grippers when the chains are stationary. The position of the grippers enables them to be located well away from the area carrying the address or other data on the card, and when so engaged by the grippers, the chains retain control of the cards entirely through the printing station until delivered to the stacker. At this point the grippers are automatically released by a cam, whereupon an intermediate conveyer chain carries the cards to the stacker in timed relation to the actuation of the stacker mechanism. With the stack of cards in the stacker raised, the intermediate conveyer in cooperation with a pusher blade gently but securely moves the last card to its proper place between stationary guides which maintain cards in alignment even though an individual card might have a tendency to buckle.

Both the main gripper chains and the secondary pusher chains are actuated in timed relation to each other through an improved Geneva motion which is so designed that both the chain assemblies are driven through the same intermittent motion which is part cam and part gear. A particular feature of the Geneva mechanism enables the gripper chains to start slowly, thence increase the velocity of the chains to bring the toothed segments of the gears into proper timed relative speed without any shock. Simultaneously, a locking cam associated with the Geneva motion prevents overtraveling. The same process is repeated in reverse at the opposite end of the stroke to decelerate one chain assembly with respect to the other. This provides constant speed for the transfer drum and at the same time enables the chains to be intermittently stopped and started without any shock.

The sheets on which the address is to be printed are gradually raised by the feed table in predetermined increments whereupon a suction head transfers individual sheets to a cam actuated gripper device on the periphery of the printing drum. A moistening roll then pivots to moisten the surface of the sheets just prior to the contact between the master card and the sheet. In the event that no sheet is transferred to the drum, the consequent absence of increased vacuum in the suction head actuates suitable mechanism to retain the moistening roll in an elevated position, thus preventing the moistening of the drum surface when there is no sheet thereon. A detector in the form of a telltale finger is positioned at the proper location above the drum so that if for any reason no master card is present at the detector, the entire machine immediately stops.

The automatic elevating mechanism for the sheet stacker is similar to the elevating mechanism for the master card feed table but the receiving table for the sheets which are stripped from the drum after the printing is finished, may be independently positioned by means of a hand crank.

Figures 1, 2:
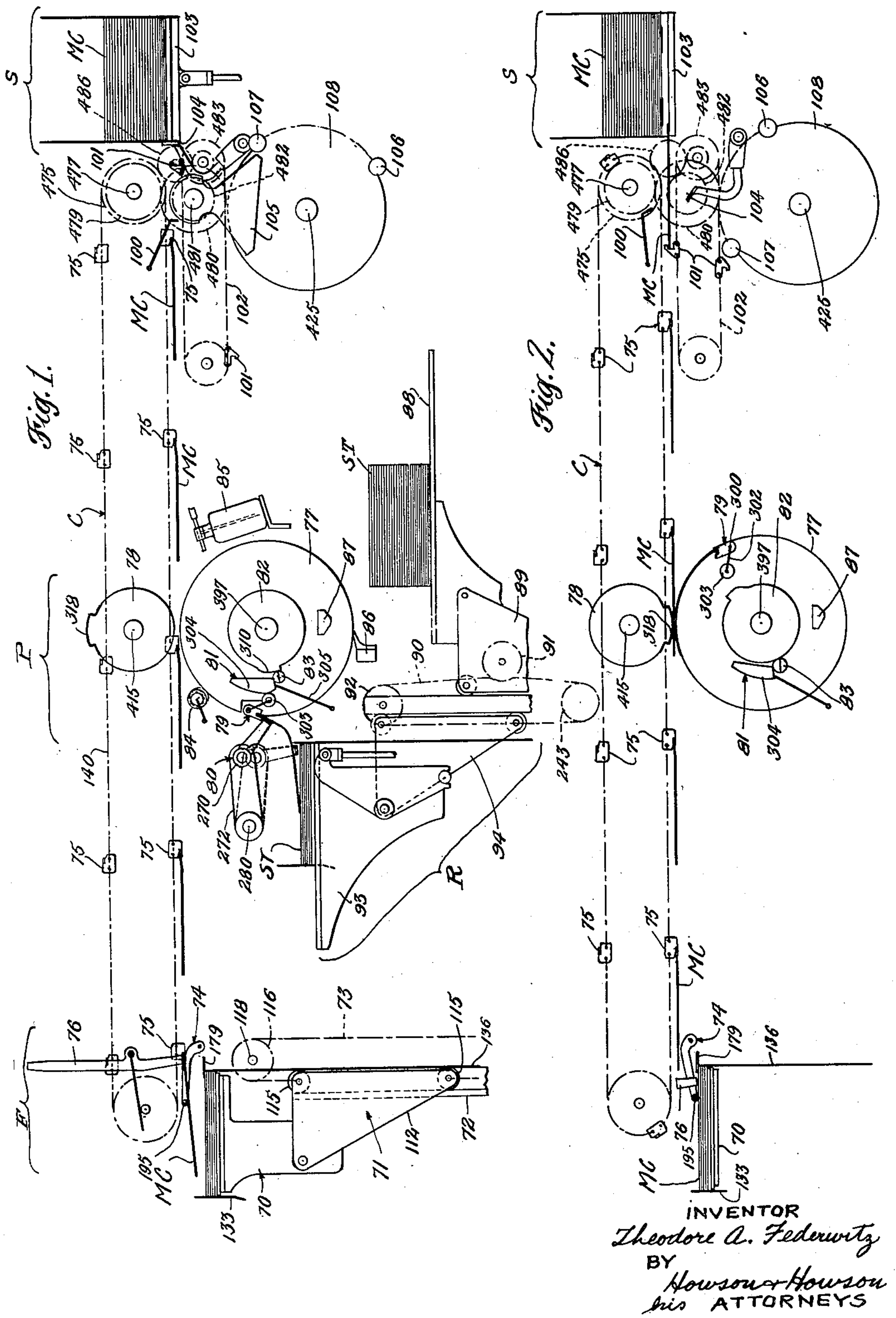
Fig. 1 is a diagrammatic view showing the relative operation of the three principal elements of the present duplicating machine.
Fig. 2 is a view showing part of the structure of Fig. 1, but wtih the elements in a moved position.

Referring now more particularly to Figs. 1–3, my improved duplicating machine consists of five coordinated elements namely: the gripper conveyer C, the card feeding mechanism F, the stacker S, the sheet feeding and receiving mechanism R, and the transfer or printing mechanism P. The master card feeding table 70 is supported on a carriage 71 vertically movable in guides 72 by means of a chain 73. A detector 74 conditions certain mechanism that automatically raises table 70 in predetermined increments as the master cards MC are fed to the conveyer grippers 75 by means of a suction head assembly 76. The intermittent action of the conveyer C carries separate master cards to a transfer station between the main printing drum 77 and the pressure drum 78. At this point, the sheets ST are tightly retained in proper registry on the periphery of drum 77 by means of a gripper assembly 79 carried by the drum. The sheets ST are fed to the gripper 79 by means of a pivoting and reciprocable suction head assemly 80. Actuation of the grippers 79 to receive a sheet ST is accomplished by means of a pivoting cam assembly 81 which is in turn controlled through cam 82 on the drum 77, and a cam follower 83. After the sheets ST have been fed to the grippers 79, they are moistened by means of a pivoting moistener roll 84 just prior to registry with the master cards MC. If desired, a suitable setting liquid may then be intermittently sprayed onto the sheets from a liquid supply 85.

As the sheets ST turn in a clockwise direction with drum 77 (as seen in Fig. 1) they are removed from the drum by means of a stripper 86 to which the sheets are simultaneously fed by the action of a cam 87 which operates the gripper 79 and its associated ejector. At this point, the sheets are deposited upon the receiving table 88 supported in a carriage 89 and controllable through chain 90 and sprockets 91 and 92. The feed table 93 for the sheets is mounted on a carriage 94 that is likewise manually controllable through chain 90. Suitable automatic mechanism to be described hereinafter, serves to raise table 93 in predetermined increments and correspondingly to lower table 88 as the sheets ST are transferred from one table to the other.

After the cards MC have passed between pressure roll 78 and the main drum 77, they are carried by grippers 75 to a release station where the grippers are opened in front of a pivoting stop 100 that serves to prevent any overtravel of the released cards. As soon as the cards are released from the grippers 75, they are engaged by one of the pushers 101 mounted on the secondary chains 102, 102. These pushers 101 convey the cards fully or partially onto a vertically reciprocating table 103 which forms the bottom element of the stacker S. As soon as one of the cards MC has passed out of control of the pushers 101, a blade 104 accurately aligns each card on the table 103 so that when the table rises, there is no danger that the card will become caught in the vertical guides of the stacker. Such misalignment might be due to the cards bouncing back or to insufficient horizontal movement.

The timing mechanism for the conveyer chains is through a modified Geneva motion assembly 105 which cooperates with rollers 106, 107 on an intermittent gear 108.

Fig. 1 shows the suction head 76 delivering one of the cards MC into a pair of grippers 75, 75 and also the suction head 80 delivering one of the sheets ST into the drum gripper 79. Fig. 2 shows the first card fully engaged by the grippers 75 and the master card at the printing station being pressed against a sheet on the drum by means of the pressure drum 78. Likewise, Fig. 1 shows the last master card about to be released by the grippers 75, 75 and directed against the stop 100. Fig. 2 shows this card being pushed horizontally by the intermediate chain pusher 101 onto the table 103 where it will become the bottom card of the delivery stack in the stacker.

*Master card suction head mechanism*

Referring now to Figs. 4–12, the master cards MC have some data 110 printed or typed on the underside thereof. Ordinarily these data are the name and address of a customer or subscriber. A stack of cards MC in a pre-arranged alphabetical or geographical sequence is placed upon the feed table 70 (as shown in Fig. 6*a*). The table 70 is supported on a cross bar 111 which is in turn rigidly mounted in a pair of triangular plates 112, 112. The table 70 is also supported on a second cross bar 113 secured to plates 112. As shown in Fig. 33, the table actually comprises two brackets which may be moved laterally with respect to each other on rods 111 and 113 in accordance with the width of the master cards MC. While Fig. 33 illustrates specifically the feed carriage 94 for the sheets, the construction and operation of the master card feeding mechanism and carriage 71 is substantially similar so that the description of Fig. 33 hereinafter applies to both the master card and sheet feed carriages.

Plates 112 and their associated structure are vertically movable in guides 72, 72 on rollers 115, 115 and the entire feed carriage 71 may be manually or automatically moved through chains 73 which run over upper sprockets 116 and lower sprockets 117. Upper sprockets 116 are keyed to a cross shaft 118 which is provided with a gear 119 that meshes with a smaller gear 120 (Figs. 7–9). Gear 120 is keyed to a stub shaft 121 which is journaled in the housing 122 and extends through the front cover **122*a* thereof, as shown in Fig. 9. A crank 123 is attached to shaft 121 so that manual operation of the crank serves to raise and lower the feed carriage assembly 71 by suitable actuation of chain 73. If desired, the crank handle 124 may be formed with a stop 125 that strikes a lug 126 to prevent the crank 123 from spinning under the weight of a stack of cards on table 70. The stop 125 may be retracted to clear lug 126 by pulling handle 124** horizontally.

The stack of cards MC on the feed table 70 is kept in proper alignment by means of a plurality of guides which comprise side fingers 130, 130 adjustably mounted on rods 131 by means of set screws 132 and an end finger 133 laterally adjustable on a bar 134 by means of thumb screw 135. A pair of vertical angles 136, 136 forms the rear corner guides for the card stack and these angles are supported in brackets 137 slidably retained on cross bar 138 by means of set screws 139.

As shown in Fig. 6*a*, the topmost card of the stack of master cards MC is engaged by suction head 76 so that it can be transferred to the grippers 75 attached to the chains 140, 140. In order to insure complete detachment of the upper card MC from the stack, I provide a pair of air nozzles 141 having suitably directed orifices which are in alignment with the topmost card in the stack. Nozzles 141 are mounted in brackets 142 and communicate with a flexible air hose 143.

The suction head 76 connected to suction hose 144, is carried by a series of links (Figs. 7 and 8) so that it follows the proper path from the pickup position above the feed table 70 to the delivery position shown in Fig. 8. Link 145 is pivoted to the suction head 76 and is actuated by means of a bell crank 146 mounted on shaft 147. A second link 148, also pivoted to suction head 76, is in turn connected to a second bell crank 149 connected to shaft 150. Bell cranks 146 and 149 are interconnected by means of links 151 and 152 so that the resultant movement of the suction head 76 is controlled by a parallelogram link action. In this way, the head 76 is retained in substantially the same inclination throughout both its vertical and horizontal travel. Vertical movement for suction head 76 is imparted by a lever 153 keyed to shaft 154 and pivotally connected to link 145 through a link 155. Shaft 154 is turned by lever 156 connected to a rocker plate 157 by means of rod 158 and the rocker plate is likewise controlled through a link 159 connected to bell crank 160 pivoted on shaft 161. The parallel linkage for imparting horizontal movement to suction head 76 is controlled by means of a long rod 162 connected at its upper end to shaft 147 by lever 163, and at its lower end to a bell crank 164 journaled on shaft 161. Bell cranks 160 and 164 are actuated by means of rods 165 and 166 respectively from suitable cams to be described more fully hereinafter. The grippers 75, 75 are carried around sprocket 170 on chains 140, 140 which have a dwell when in the position shown in Figs. 7 and 8. Concurrently, the grippers are opened by means of an arm 171 connected to shaft 172 which is in turn actuated by rod 173 and lever 174 connected to shaft 172, which is in turn actuated by rod 173 and lever 174 connected to shaft 172, and a lever 175 connected to shaft 176. Rod 177 controls shaft 176 through a lever 178 in such a way that the grippers are held open to receive the upper card MC when delivered thereto by means of the suction head, whereupon they close just prior to the next increment of movement of the chains 140, 140. The action of the air blasts from nozzles 141 is supplemented by a small spring separator 179 which snaps over the edge of each card MC to insure that only one card at a time is delivered to the grippers.

*Chain grippers*

Figs. 34–36 illustrate in detail each gripper 75 which comprises a spring-loaded rocker arm 180 pivotally mounted in the gripper body by a pin 181 and having a jaw 182 adapted to close against an abutment 183. Plunger 184 serves to retain the jaw 182 closed by means of a helical compression spring 185 except when the jaw is forced to an open position by means of pressure on the upper extension 186 of rocker arm 180. In order to permit the grippers to pull the cards out of control of the suction head 76, the suction or vacuum in the head is broken when a valve 187 of relatively large diameter in the suction line 188, is opened by means of a bell crank 189 (Fig. 8). Crank 189 abuts a roller 190 on the valve cap 191 and is pivoted through a cam-actuated rod 192. The timing of rod 192 is such that the decrease in vacuum in suction head 76 occurs after the grippers 75 have securely engaged the card that has just been transferred thereto.

*Card and sheet table elevating mechanism*

The mechanism for automatically raising table 70 in predetermined increments substantially equivalent to five master cards, will now be described, as seen best in Figs. 10 to 12. The detector bar 195 is carried by a pair of brackets 196, 196 which are keyed to a cross shaft 197 mounted in brackets 198, 198 (Fig. 3). An adjustable connection between shaft 197 and stub shaft **197*a* is provided through a swivel lug 200 formed integrally with arm 201 which is in turn clamped to shaft 197*a*. An adjustable thumb screw 202 having an elongated shank 203 in threaded engagement with lug 200, is spring-loaded by means of a helical compression spring 204 between the lug 200 and a boss 205 formed integrally with arm 206 keyed to shaft 197. It will thus be apparent that turning of thumb screw 202 provides adjustment for the relative angular positions of shafts 197 and 197*a***.

Rocker plate 157 is keyed to a shaft 207 which also carries a cam arm 208 in alignment with a roller 209 on arm 201. During each cycle of reciprocatory movement of rocker plate 157, arm 208 is turned clockwise to lift detector bar 195 to a position such as shown in Fig. 8. This permits the topmost card MC to be withdrawn from the stack by suction head 76. As soon as the chains 140, 140 and grippers 75, 75 have withdrawn the topmost card from under bar 195, rocker plate 157 oscillates counterclockwise to lower cam arm 208 and bar 195 due to the action of a helical extension spring 210. Accordingly, shaft 197 turns until bar 195 rests upon the top card in the stack (as shown in broken lines in Figs. 7 and 10) and it will thus be apparent that after each card is withdrawn by the suction head the bar 195 drops to successively lower angular positions as the height of the stack on table 70 diminishes.

The setting of thumb screw 202 controls the relative angular position of shafts 197 and **197*a* so that when bar 195 drops to a predetermined minimum due to the absence of cards in the stack, trip lever 211 keyed to shaft 197*a* actuates trigger rod 212 which is slidably mounted in brackets 213, 213 (Figs. 7 and 8). As shown in Fig. 10, there will be ample clearance between the upper end of trigger rod 212 and lever 211 until the height of the stack of master cards diminishes to the predetermined setting. Likewise, there must be clearance between roller 209 and cam arm 208 to permit the detector bar 195 to drop sufficiently far to trip the lever 212. This in turn pivots a sear 214 in a clockwise direction (as shown in Fig. 8) against tension of a spring-loaded plunger 215. This pivoting of sear 214 disengages the sear arm 214*a* from a shoulder 216 on pawl carrier 217, thus conditioning the carrier for clockwise rotation on shaft 121 under tension of spring 218**.

The carrier 217 pivotally supports a pawl 219 which cooperates with teeth on the periphery of ratchet 221. A spring-loaded locking pawl 220 is pivotally supported from the housing 122 and engages the teeth of ratchet 221. To compensate for overtravel of the pawl carrier, a pawl holding link 222 may be employed to prevent premature engagement of pawl 219 with the ratchet. After the sear arm **214*a* clears shoulder 216, the carrier 217 is retained or restrained from turning by rod 223 which is connected to the carrier by a pin 224 and has at its opposite end a clevis 225 slotted at 226, which is in turn connected to shaft 207 by an arm 227 and a pin 228 slidable in slot 226. Cam arm 208 is substantially in the position shown in Fig. 10 at the time the trigger rod 212** trips the sear.

As stated above, tripping of the sear transfers retention of the pawl carrier 217 from the sear arm **214*a* to rod 223 and arm 227. Now as the shaft 207 turns clockwise, cam arm 208 again raises the bar 195 and the pawl carrier concurrently turns in a clockwise direction under tension of spring 218 which is restrained only by rod 223. As shaft 207 reverses its direction of movement to turn counterclockwise, the pawl 219 is engaged with the ratchet teeth, thus turning shaft 121; and when arm 227 has reached its maximum counterclockwise angular position, sear arm 214*a* again springs under shoulder 216 to retain the pawl carrier stationary and to permit independent movement of pin 228 in slot 226 until the cycle is repeated due to the lowering of the stack. This turning increment of the shaft 121 is calculated to raise table 70 an amount approximately equal to the thickness of five master cards through gears 120, 119 and shaft 118** as has been previously described.

It will be understood that the increments through which the table 70 may be raised in any one cycle, may be adjusted in accordance with the number of teeth in ratchet 221 so that the interval between successive actuations of the ratchet may produce any increase in height of the table. When desired, the elevation of table 70 may be manually set. In this event, the operator turns handle 230 in a counterclockwise direction, thus retracting both pawls 219 and 220 and permitting the shaft 121 to be turned directly through crank 123. It will be apparent however, that it is only necessary to release handle 230 when the operator desires to lower table 70 since it is possible to raise the table by turning handle 124 in a counterclockwise direction. When the operator lowers the table as described above, it is necessary to hold the handle 230 depressed and at the same time retain the crank 123 with the other hand, to restrain the crank from spinning if the weight of the stack of cards on the table is excessive.

It will be understood that the position of lug 126 is so fixed that it interferes with the free turning of handle 124 only when handle 230 is depressed to remove downward control of table 70 from ratchet 221 and pawls 219, 220.

*Transfer or printing mechanism*

Generally speaking, the copy sheet feed table assembly 93 resembles the card feed table 70 in a machine intended to use uniformly flat copy sheets. When the copy sheets are not of uniform thickness so that a stack of sheets has uneven height at the corners thereof, an adjustable or tiltable feed table for the copy sheets is utilized. Such a self-righting construction is shown and described in conjunction with Figs. 53–58. The feed table assembly 93 however, can be adjusted to accommodate a stack of copy sheets which varies widely in lateral dimensions, and for this purpose I provide a pair of transversely slidable brackets 93*a*, 93*a* adjustably mounted on cross shafts 235 and 236 by means of set screws 237, 237 (Fig. 33). Shafts 235 and 236 are anchored at each end in carriage plates 94*a*, 94*a* having rollers 238, 238 operable in vertical guides 239, 239. It will be understood that the construction at the opposite end of the carriage 94 is identical to that shown and described in conjunction with Fig. 33. A pair of endless chains 90 are anchored to the carriage plates 94*a* by means of posts 241, 241 and the chains 90 pass over upper sprockets 92 and lower sprockets 243 (Figs. 1 and 53). Since the weight of the sheets may be substantial, I incorporate a plurality of counterbalancing springs 244 in a cylinder 245. Bracket 246 connected to shafts 235 and 236 has a piston 247 which is operable in the cylinder 245 to compress the springs in accordance with the weight of the sheet stack. Suitable guides and stops for the sheet stack comprise a single longitudinal track 250 to which a bracket 251 is slidably clamped by means of a set screw 252. Bracket 251 carries a square transverse bar 253 which likewise slidably supports corner brackets 254, 254 secured by means of set screws 255, 255. A pair of front corner guides 256 are adjustably mounted on shaft 257 by means of brackets 258, 258, and the air jets 259, 259 movable with guides 256 are carried in brackets 260, 260.

The receiving table 88 for the sheets is supported on a carriage 89 which reciprocates vertically in guides 261, 261 through rollers 262, 262 (Fig. 6*b*). In order to provide independent movement for table 88, carriage 89 is actuated by means of a pair of sprockets 91, 91 journaled on the carriage and engageable with the backs of chains 90. Sprockets 91 may be turned through suitable gears (not shown) connected to crank 263 as shown in Fig. 6*b*. When sprockets 91 are stationary, it will be understood that the feed table 93 reciprocates vertically and in the same increments as does the receiving table 88. However, as the stack of sheets diminishes on table 93, it correspondingly increases on table 88 so that the action of chain 90 controls the opposite raising and lowering of the tables. Thus the relative starting positions of the tables may be set by means of crank 263 in accordance with the height of the sheet stack initially deposited on the table 93.

Automatic actuation for chain 90 is provided through mechanism identical in operation to that employed for table 70 and it is therefore believed unnecessary to duplicate this showing and description. The actuating means for the table raising mechanism is initiated from the shaft 264 which journals the detector bar 265 on brackets 266, 266. Thumb screw 267 corresponds to screw 202 and arm 268 (Fig. 14*b*) corresponds to arm 227. Trip lever 211*a* on a stub shaft 264*a* corresponds to trip lever 211 in Fig. 12.

*Mechanism for delivering sheets to drum*

The means for transferring sheets from the supply stack to the grippers 79 on drum 77 comprises a plurality of suction heads proper or nozzles 269 mounted on a rotatable suction conduit 270 (Figs. 14*a* and 14*b*). Each nozzle is provided with an individual valve 271 which can be opened or closed in accordance with the width of the sheets being printed. In Fig. 14, the three innermost valves 271 are shown open, whereas the two outermost valves are shown closed. Conduit 270 is journaled in brackets 272, 272 and has at one end a rotatable packed coupling 273 which connects the conduit with suction hose 274. Rotation of the suction heads with conduit 270 and brackets 272 is provided by means of a crank 275 and a link 276 which connects the crank to a pivoting lever 277 which is oscillated through a cam follower 278 in contact with cam 279. It will thus be understood that cam 279 provides the horizontal movement for the suction heads 269, 269. Vertical movement is imparted to the suction heads 269 through oscillation of shaft 280 journaled at 281, 281 in the frame members 282 and 283. One end of shaft 280 is clamped to a lever 284 connected to a rocker arm 285 by means of a link 286. Rocker arm 285 is tightly clamped to cross shaft 287 and is actuated by a cam 288 and cam follower 289.

It will be understood that shaft 287 extends through the frame 283 and is journaled at the opposite end in frame 282 so that oscillation of shaft 287 likewise actuates lever 268 for the sheet table elevating mechanism. Lever 277 as well as lever 290 are freely journaled on shaft 287. Cam 291 controls the movement of the detector bar 265 through cam follower 292 on lever 290 which in turn engages the roller 293 on the detector bar actuating arm 294 (Fig. 13). A spring-loaded plunger 295 serves to retain cam follower 292 tightly against cam 291.

In order to insure that only one sheet is delivered at a time by the suction nozzles 269, I provide a small spring clip 296 which extends slightly over the edge of the stack of sheets ST and snaps the succeeding sheet back onto the top of the stack as soon as the uppermost sheet has been elevated by the suction head assembly 80.

*Drum gripper mechanism*

The gripper assembly 79 on drum 77 is of particular importance because the construction employed in the present invention enables the sheets to be fed continuously to the drum without the necessity of stopping the drum at all. This permits much more smooth and accurate operation of the entire machine. Referring to Figs. 15 and 17–19, the drum gripper assembly comprises a main actuating shaft 300 journaled in a transverse or axial groove 301 in the drum 77. The shaft extends beyond the end of the drum and is actuated by means of an arm 302 which carries a roller cam follower 303 actuated by a pivoting cam surface 304 (Fig. 13). A lever 305 is freely journaled on shaft 287 and spring-loaded by means of a helical extension spring 306. Lever 305 is provided with a cam follower 83 having a sharp cutoff 308 which cooperates with cam 82.

When lobe 310 of cam 82 rotates to the position shown generally in Fig. 6*b*, lever 305 will be pivoted counterclockwise and cam surface 304 rotates arm 302 and shaft 300 to open the grippers at the proper point to receive the top sheet being delivered from stack ST. Groove 301 is provided with an L-shaped gripper jaw 311 having a plurality of drilled holes to accommodate the finger spring plungers 312, 312 and finger springs 313, 313. Gripper jaw 311 is also provided with a plurality of radially facing slots 314 which are in alignment with the grippers 315, 315 keyed to shaft 300. Each gripper 315 has a relatively wide jaw 315*a* which overlaps the slots 314 and is permitted to lightly clamp the sheets between the fingers and the outer faces of the gripper jaw 311. The spring-loaded plungers 312 serve to close the fingers against the jaws to tightly grip the sheet except when cam follower 303 is held in a moved position due to contact with cam face 304 or due to contact with a stationary cam 87 mounted on a bracket 317. It will be understood that the grippers are loaded at a station shown substantially in Fig. 6*b*, by means of the suction nozzles 269, 269. As soon as the drum 77 turns slightly in a clockwise direction, lever 305 springs to the right when the cut-off 308 drops from cam lobe 310. This instantly closes the gripper fingers against the jaw 311 to clamp the sheets securely therebetween. Continued rotation of the drum 77 brings the sheets to a zone underneath the pressure face 318 on pressure drum 78 and in registry with the data 110 on the master cards.

*Sheet stripper mechanism*

In order to remove the sheets from the grippers, I provide a stationary cam 87 to open the grippers at a station above the receiving table 88. To insure that the sheets are stripped from the drum, I employ a kickout blade 319 on the grippers 315 which moves in the slots 314 of the gripper jaw 311. Fig. 19 shows how outward movement of the grippers 315 not only releases the pressure between the grippers and the jaw, but also ejects the sheets from the jaw and into the path of one or more stationary strippers 86.

This feature is of importance because it eliminates the necessity for extending the strippers 86 into grooves which would otherwise have to be machined in the periphery of the drum. Such an expedient would ordinarily be feasible, but where it is imperative that the machine accommodate sheets of various widths and where it is also important that the printing area be spaced transversely in any desired location over the periphery of the drum, the provision of a plurality of grooves in the periphery of the drum would prevent obtaining a clear impression of the data on the sheet in the event that the pressure area for the transfer happened to register with one of the grooves. This rather minor point could readily mean improper delivery or non-delivery of a piece of mail if only one number of the street address were missing or obliterated. Due to the fact that most automatically addressed mail is not first class matter, it would not reach the addressee unless the entire address is accurate and clear.

In other words, it was necessary to design the present machine in such a way that the periphery of the drum would be perfectly smooth throughout any possible area against which it might be necessary to apply transfer pressure. This in turn required that the strippers 86 had to clear the periphery of the drum. Consequently, the primary stripping action should occur by mechanism carried on the drum. The above-described stripper structure has proved to be inexpensive, simple, absolutely foolproof, and at the same time permits a perfectly smooth drum periphery.

*Moistening apparatus*

As soon as a sheet has been transferred from the supply stack ST to the drum as described above, it is carried to a station intermediate the transfer or pressure drum 78 and the suction head assembly 80. At this point a moistening roll 84 is automatically applied to the area of the sheet on which the data are to be printed. In accordance with well known practice, a suitable solution for this purpose employs alcohol as the major ingredient. Fig. 15 shows the details of the moistener 84 which comprises a roller 321 mounted on a shaft 322 which is in turn journaled in bracket 323. The shaft 322 is driven by means of a series of spur gears 324, 325 and 326, the first of which is keyed to shaft 322, the second being freely journaled on a hub **323*a* of bracket 323**.

Arms 327, 327 rotatably journal bracket 323 which is keyed to a shaft 328 extending through a sleeve 329 anchored in bracket 330 and frame 283. Gear 326 is keyed to a shaft 332 journaled in brackets 333, 333 and operatively connected to the compound drum gear 334 by means of idler gears 335 and 336. A felt wiper pad 337 is pivotally mounted in bracket 323 under tension of spring 338 so that the pad wipes liquid evenly over the surface of roller 321. Liquid is supplied to the roll through a conduit 339 fed by a suitable liquid supply pump, to be described more fully hereinafter. Thus it will be understood that when shaft 328 is turned in sleeve 329, the entire bracket 323 together with the roll 321 is pivoted about the axis of the shaft in arms 327, 327. This pivoting motion however, does not interfere with continued rotation of the moistening roll through the gear trains 324–326 and 334–336 because spur gear 325 is concentric with shaft 328. In normal operation, the moistener roll 321 is pivoted to contact the surface of each sheet as the printing area passes between the moistener roll and drum 77. However, if for any reason the suction head 80 fails to pick up a sheet or if the supply of sheets becomes exhausted, then it is important that the moistening roll 321 be prevented from contacting the surface of the drum 77 because the transfer from the master cards would then be made directly onto the drum, thus causing a highly undesirable smear on the succeeding sheets.

*Safety lock for moistening roll*

Referring now particularly to Figs. 15, 16, 20 and 21, it will be seen that shaft 328 is keyed to a rocker arm 350 which is in turn actuated by means of a rod 351 and a slotted connection 352 permitting limited overtravel between the rocker arm 350 and the rod 351. One lateral face of arm 350 is provided with a series of steps 353, 354 and 355 and an adjustable stop 356. These steps 353–355 are in registry with a fluid housing 357 which is provided with a spring-loaded piston 358 enclosing piston spring 359 and having one end thereof in communication with suction conduit 360. Piston 358 is formed integrally with a piston rod 361 which extends through a fluid seal 362 in housing 357. Housing 357 also contains a spring-loaded plunger 363 normally adapted to engage the step 353 of rocker arm 350. Plunger 363 is actuated by means of a spring 364 retained by a screw 365 (Fig. 16).

In normal operation, assuming there is no interruption in the delivery of sheets ST to the drum 77, the safety locking mechanism is in the relative position shown in Fig. 16, just as the area of the sheet to be moistened passes under roll 321. The contour of the cam for actuating rod 351 is such that the rod moves to the left (as shown in Figs. 15 and 16) thus permitting the spring-loaded plunger 363 to turn arm 350 and shaft 328 in a clockwise direction to apply moisture to the sheet. Substantially at the limit of rotation of shaft 328, the stop 356 releases a trigger 366 pivoted at 367 and under control of a flat spring 368. This occurs at a time when the suction heads 269 are returning to pick up the next succeeding sheet. Therefore, there being no suction in conduit 360 which is in communication with conduit 274, spring 359 moves piston 358 to the right (as shown in Fig. 20) so that piston rod 361 seats first on high step 355 of arm 350 and with movement of rod 351 to the right, the arm is turned counterclockwise until the rod snaps onto the low step 354 (as shown in Fig. 21). When the suction nozzles 269, 269 are closed by contact with the next succeeding sheet, there is an increase in vacuum so that the piston rod 361 is retracted from step 354 and locked in a retracted position by trigger 366 which engages shoulder 369 on the piston rod. The mechanism is then conditioned to repeat the cycle.

If however there is no succeeding sheet to provide the increase in vacuum in cylinder 367 as described above, then piston rod 361 is not retracted and remains seated against step 354, as shown in Fig. 21. In this condition, the moistening roll will be locked because the piston rod prevents arm 350 from turning even though rod 351 is moved to the left. In this event, pin 370 rides freely in slot 352 since the arm 350 is held stationary.

In order to release the suction from the suction nozzles 269 at the time the grippers 79 take over control of the sheets, I provide a suction relief valve 371 which is similar in function to valve 187 and which is controlled by means of pivoted arm 372, cam follower 373 and cam 374 (Figs. 6*b* and 14*a*). It will be apparent that the test zone for determining whether or not the suction nozzle 269 has picked up the next sheet, will be between the station at which the printing is transferred from the master cards to the sheet, and the point at which the valve 371 is opened. Otherwise, the moistening roll would be improperly locked due to the absence of suction when the valve 371 is opened. Therefore, an additional function of the trigger 366 is to retain the piston in a retracted position during the time that valve 371 is open.

When the moistening roll is pivoted by actuation of rod 351, trigger 366 is always released and the piston 361 thereby contacts steps 355 and 354 (as shown in Figs. 20 and 21). Normally the test position for suction occurs after the moistening roll has been completely retracted, so that the piston will be withdrawn from step 354. However, if the test position occurs slightly sooner, the piston will be withdrawn from the high step 355. In either event, when the piston is withdrawn, it is retained by latch 366 until valve 371 closes. Since the test area occurs after the printing, it is not necessary to provide for any advance in the retraction of the piston because there is ample time between the test position and the moistening position to properly condition the safety interlock. In addition to the prevention of operation of the moistening roll, I also provide automatic devices associated with the suction for stopping the entire machine in the event that there is no master sheet, or in the event the supply of master cards runs out.

In machines of this sort, it is desirable to keep a record of the number of sheets printed, and I therefore provide an automatic counter 375 which is connected to the arm 350 by means of links 376, 377 and bell crank 378. In this way the counter is not controlled by revolutions of the drum but registers only sheets actually printed because it is actuated only by the moistening roll when there is a sheet actually on the drum.

*Master card detector*

Figs. 13, 15 and 22–25 show the mechanism for stopping (or preventing starting) the machine in the event there are no master cards or there is a skip in the supply of master cards. It is important that this safety device be located as close as possible to the printing station to insure against continued operation of the machine should there be any failure to deliver master cards properly at this point. The master card detector comprises a stationary shaft 385, mounted across frame members 282 and 283, that carries an adjustable foot 386 in registry with the centerline of the drum and conveyor (Fig. 15). The end of foot 386 is bifurcated at 387 so that a detector finger 388 keyed to shaft 389 is retained in a lowered position by a master card passing underneath foot 386 and above the finger 388 (Fig. 22). An electrical switch 390 is connected to suitable control devices to be described more fully hereinafter, in such a way that the switch arm 391 can be thrown by a rocker arm 392 secured to shaft 389 and under tension of a spring 393. Another rocker arm 394 carrying a roller 395 pivots to retain the arm 392 in a retracted position through operation of a suitable cam actuated rod 396.

When the grippers 75 on chains 140 have advanced to bring a master card between foot 386 and finger 388, rod 396 pivots to the position shown in Fig. 22, to remove control of arm 392 from roller 395. With the card advanced to this position, the finger 388 is retained depressed and switch 390 is not thrown even when rod 396 swings roller 395 away from rocker arm 392 (as shown in Fig. 22). If there is no master card between the foot 386 and the finger 388 under these conditions, arm 392 pivots counterclockwise under tension of spring 393 to throw the switch 390, thus indicating that no card is at this zone. Ordinarily the leading edge of the cards might be considered sufficient to actuate the finger 388 when they are advanced by the chains 140, 140. However, as explained previously, it is of extreme importance to reduce wear and damage to the cards to an absolute minimum. Therefore I provide the particular mechanism described above, to retain the finger 388 in a lowered position during all times when the master cards are being advanced under the foot 386, the detecting function of the finger being performed only when the card is stationary so there is no danger of fraying or injuring the master cards.

*Drum assembly*

Referring now to Figs. 14*a*, 14*b* and 15, the drum 77 is carried on the drum shaft 397 by means of set screws 398, 398. Shaft 397 is journaled in frame 282 at 399 and in frame 283 at 400. A countershaft 401 journaled in subframe member 402 and frame 283 is driven from the main drive shaft 403 by means of a worm 404 and worm wheel 404*a*. Shaft 401 at one end is provided with a spur gear 405 which meshes with gear 406 freely journaled on shaft 397. However, gears 406 and 344 are rigidly connected to each other to form a compound gear. This drives the moistening roll as described previously, and also drives pressure roll 78 since these two units must be turned with the chain grippers.

The main drive for the drum is through a spur gear 407 keyed to the opposite end of shaft 401, and meshing with a spur gear 408 freely journaled on shaft 397. A clutch plate 409 keyed to shaft 397 drivingly contacts the face of gear 408 through a suitable friction disk 410. In order to vary the timing between the drum and the conveyor chains, I provide a clamping nut assembly 411 which when loosened, permits the clutch plate 409 to be rotated with respect to gear 408 and the relative position of these members may be conveniently indicated by means of a dial plate 412. When the proper setting has been made to time the position of the sheets with respect to the master cards so that the data to be transferred are registered at the desired area on the sheets, nut 411 may be locked to retain this timing between the drum and the conveyer.

The pressure drum or roll 78 (Fig. 6*b*) is keyed to shaft 415 which is in turn journaled in slidable bearing blocks 416, 416. In order to compensate for variations in thickness of the sheets being printed, it is desirable to provide suitable means for adjusting the nip clearance between the pressure roll 78 and the drum 77. Blocks 416, 416 are vertically slidable in guides 417 and the height of the blocks is controlled by means of a vertical threaded shaft 418 engageable with a wormwheel 419 in housing 420. Hand wheel 421 is secured to wormwheel shaft 422 to facilitate convenient adjustment of the pressure roll. The drive for the pressure roll is through a gear 423 keyed to shaft 415 and meshing with the large compound gear 334 so that the pressure roll always turns in accordance with the speed of the conveyer chains 140, 140 and is not affected by the timing adjustment for the drum 77. The ratio of the gear train for the pressure roll provides a 2:1 stepup in the speed of this drum with regard to the speed of the drum 77, so the diameter of roll 78 may be substantially reduced in the interests of compactness.

*Camshaft*

Referring now to Figs. 6*c* and 26, the main camshaft 425 is journaled in frame members 282, 283 and bracket 283*a* at the back of the machine (Fig. 49). The camshaft is provided with a clutch cam 426, the operation of which will be described more fully hereinafter, and a wormwheel 427 which is driven from the main drive shaft 403. Proceeding from back to front on the machine or from top to bottom in Fig. 26, next comes the cam 428 which actuates the rod 396 for the master card detector through rocker arm 429 freely journaled on countershaft 430 and carrying a cam roller 431. Countershaft 430 is likewise journaled in frame members 282 and 283 and is reciprocated by an arm 432 keyed to the shaft and having a cam roller 433 connected to the moistener cam 434 secured to a camshaft 425. The proper reciprocatory action for the moistening roll is transmitted to rod 351 through a lever 435 keyed to countershaft 430. The various cams for actuating the card feeding mechanisms are also keyed to camshaft 425 in such a way that cam 436 actuates the grippers 75 through rod 177 and a rocker arm 437. Cam 438 controls the horizontal component of the movement of the suction head 76 through shaft 162, rod 166 and rocker arm 439. Cam 440 controls the vertical component of the suction head movement and the feed table elevating mechanism through rods 158, 165 and rocker arm 441. Cam 442 controls the valve 187 through rod 192 and rocker arm 443. It will also be understood that the corresponding mechanism for elevating the sheet feed table 93 can be operated from cam controlled rods similar to the rods 165 and 166 which are supported in a bracket 444 and retained in an extended position through helical compression spring 445 (Fig. 6*a*).

Cam 446 on camshaft 425 actuates blade 104 which is pivoted to the frame at 447 and connected to the cam follower 448 by means of a rocker arm 449 freely journaled on shaft 430 between collars 450, 450. Link 451 connects rocker arm 449 with a lever 452 on shaft 447 (Fig. 6*c*). Cam 453 controls rocker arm 454 freely journaled on shaft 455 between collars 456, 456 through a cam follower 457. Rocker arm 454 actuates the table 103 of the stacker ST through a link 458. Cam 459 on camshaft 425 actuates the card stop 100 which is secured to shaft 460 and connected to rocker arm 461, journaled on shaft 430 between collars 462, 462, by means of a link 463. Cam 464 actuates the moistening liquid pump 465 through rocker arm 466 journaled on shaft 455 between collars 467, 467. Pump 465 supplies the alcohol mixture to conduit 339 from a reservoir 468 and check valve housing 469, and the stroke of the pump piston rod 470 is adjustable through a thumb screw 471 (Fig. 6*c*).

*Drive for secondary chain*

Particular attention is directed to the manner in which primary chains 140, 140 and secondary chains 102, 102 are intermittently driven from the constantly rotating camshaft 425.

Referring now to Figs. 6*c*, 27–32, the main conveyer chains 140, 140 are mounted on sprockets 475 and 476 at the stacker end of the machine, and these sprockets are keyed to a countershaft 477 journaled in frame members 478, 478 and 282. Shaft 477 at one end carries a spur gear 479 which meshes with a gear 480 on stub shaft 481 which also carries a gear 482 drivingly connected to the sprockets 483, 483 of secondary chains 102, 102 through shaft 484, gear 485 on shaft 484, and idler gear 486. It will thus be apparent that this construction provides a fixed driving train between the primary and secondary conveyers. Gear 480 on shaft 481 intermittently meshes with the toothed segment 487 on interrupted gear 108. A pair of rollers 106 and 107 adjacent opposite termini of toothed segment 487 are positioned to engage the arms 491 and 492 of a Geneva plate 493 keyed to shaft 481.

Figs. 27–30 illustrate the various positions in the operation of the combined Geneva and gear drive. Gear 108 turning in a counterclockwise direction engages arm 491 by means of the roller 107 as shown in Fig. 27. Due to the rapid change in the radius of contact between roller 107 and arm 491, shaft 481 is quickly accelerated from a relatively slow speed incident to initial engagement of the roller and the arm, to a maximum speed incident to engagement of roller 107 and the arm when the roller is substantially on the line connecting the centers of shafts 481 and 425. At this position, the speed of shaft 481 has been increased so that the teeth on gear 480 mesh with the toothed segment 487 without any clash or jerk. Continued counterclockwise rotation of the interrupted gear 108 rotates shaft 481 and consequently both conveyer chains until roller 106 is engaged by the opposite arm 492 of the Geneva plate (Fig. 29). At this point, the teeth on gear 480 and segment 487 disengage, control of the shaft being taken over by a roller 494 on plate 495 keyed to shaft 481. Continued rotation of gear 108 turns plate 495 until the secondary roller 496 contacts the periphery of the large locking plate 497 as shown in Fig. 31, thereby locking the plate 497 with respect to plate 495 and stopping movement of the conveyers. Fig. 28 illustrates the position of rollers 494 and 496 at the beginning of the conveyer drive cycle, in which the clearance required to accelerate plate 495 when arm 491 is actuated by roller 107, can be clearly seen.

Similarly, it is desirable to control the rate of deceleration of the conveyers so that they may be stopped gradually, thus avoiding undue shock. To accomplish this, the rate of deceleration is determined by the position of roller 494 and the configuration of the following periphery of plate 497. However, to prevent any overtravel of plate 495 and to retain roller 494 in contact with the periphery of plate 497, the arm 492 of Geneva plate 493 is restrained from overtraveling by roller 106 until the roller becomes completely disengaged with the arm 492, at which time rollers 494 and 496 are both in contact with the periphery of plate 497 (as shown in Fig. 31).

Fig. 34 shows the position of the blade 104 and the card stop 100 with the parts timed substantially as shown in Fig. 6*c*. The openers 500, 500 for grippers 75 are shown mounted in line with the upper arms 186, 186 of the fingers. Lateral guides 501, 501 for the master cards as well as upper guide structure 502, are likewise seen in Fig. 34. These features insure proper registry of the master cards and correct any misalignment that may have occurred during their travel with the conveyer.

*The stacker*

Figs. 6*c* and 37–44 illustrate the manner in which primary and secondary conveyers, together with their associated mechansim such as the card stop 100 and blade 104, cooperate to transfer the master cards from the conveyer grippers 75 to the stack S with no damage to the cards. The stacker proper comprises four vertical guide members 503, 504, 505 and 506. Table 103 is adapted to reciprocate vertically between the guides 503–506 and its reciprocatory action is controlled by means of guide rods 507, 507. Side members 508, 508 of the stacker are apertured at 509 to receive the teeth 510 of latches 511, 511 (Fig. 42). These latches 511 are spring-loaded at 512 and are controlled by spring-loaded rocker arms 513, 513 on table 103.

Figures 37, 38, 39:
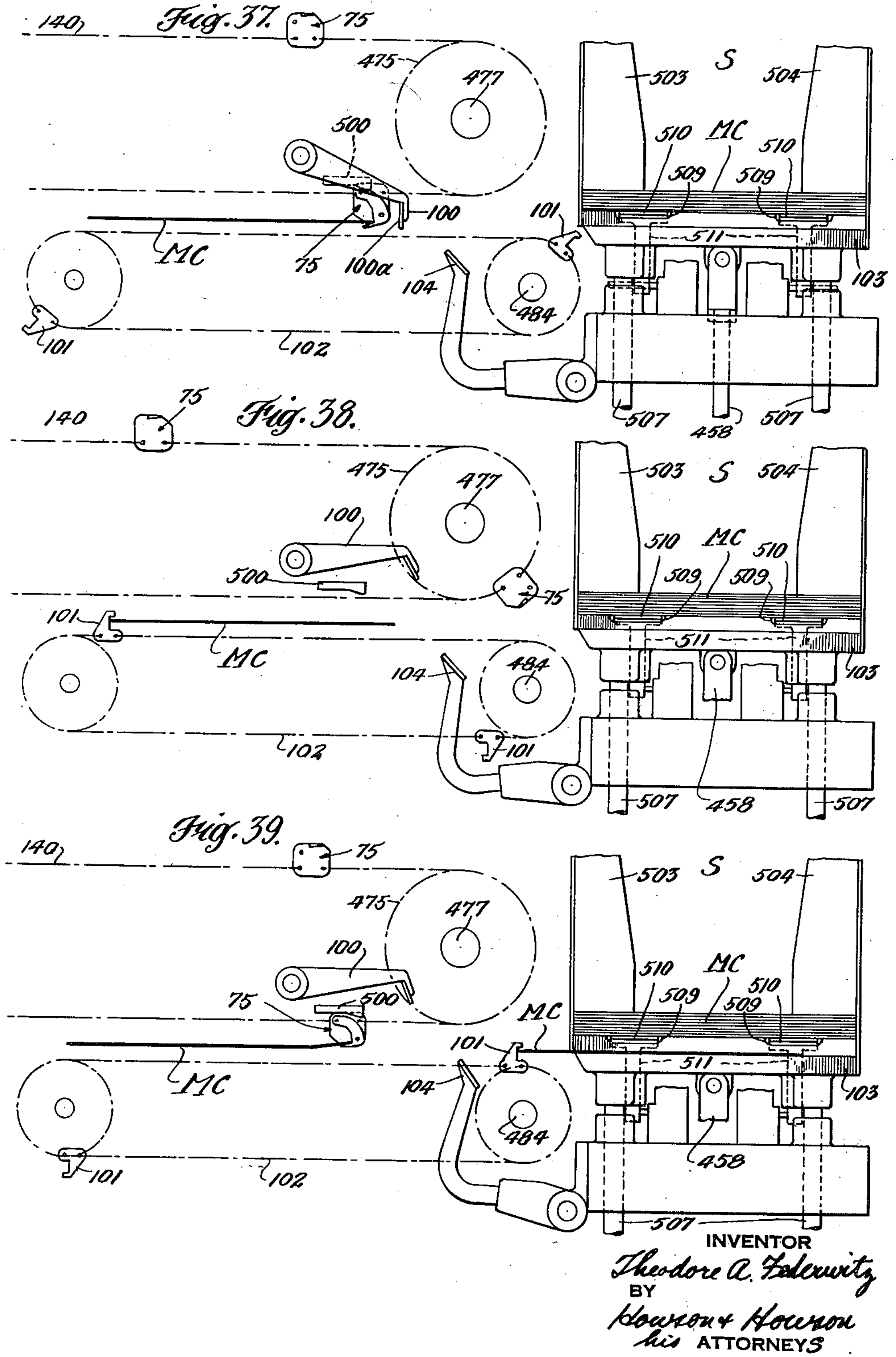

Referring now to Figs 34 and 37, the transfer of a master card from the grippers 75, 75 to the stacker will be carefully explained. When the cards MC are initially engaged by the grippers 75, they slide along a pair of guide rails 515, 515 which are interrupted in a zone between the printing drum 77 and the pressure roll 78. When the cards are brought by the conveyers to the station (shown substantially in Fig. 6*c*) they are released by the openers 500 and are then supported completely by the rails 515. Since the openers release the conveyers just as the chains start a travel cycle, the cards may travel forwardly after release by the grippers. In this case, they will slide forward and come to rest against the face 100*a* of the stop 100. Upon the next sequential actuation of shafts 477 and 484, the pusher 101 on chain 102 comes around to engage the trailing edge of the card MC as shown in Fig. 38. In this position, the stop has been elevated, the gripper which carries the card (Fig. 37) has progressed to avoid any interference, and the stack of master cards in the stacker S is supported entirely above and by the teeth 510 as shown in Figs. 38 and 42.

Continued movement of pushers 101 on chains 102 advances the card MC onto table 103 as shown in Fig. 39. Even though the cards may overtravel or slide due to inertia, they would not ordinarily be accurately positioned on the table merely by the pushers 101. However, this is accomplished by the blade 104 which pivots to the position shown in Fig. 40, thus accurately aligning the card on the table 103 whereupon the elevating mechanism for the table raises the card past the teeth 510 as shown in Fig. 43. As the table 103 is raised, the arms 513 pivot the latches 511 due to the cam action of rollers 516, 516 on cam surfaces 517, 517 of the latches. As soon as the lowermost card has been elevated well above the tops of teeth 510 (as shown in Fig. 44) rollers 516 slip over the upper edge of surfaces 517 to permit the latches to spring back into position. Then as the table 103 returns to its lowered position, the stack of cards S comes to rest on top of teeth 510 and the arms 513, 513 are pivoted to the dotted line position in Fig. 44 so that the rollers clear surfaces 517, 517 without again displacing the dogs on the downward travel of the table. The table is then ready to repeat its elevating and stacking cycle. While the above operations are taking place in the stacker, the next card has been brought into position by the grippers 75 (as shown in Fig. 39) with the stop 100 in a raised position. Figs. 40 and 41 show the stop lowered just before the cards are released from the grippers by the openers 500. Figs. 39–41 show the mechanism with both conveyers stationary whereas Fig. 37 illustrates the condition of the openers 500 just after the conveyers have started up so that the grippers 75, 75 will be completely out of the path of the master cards before the cards are carried forward by the pushers 101.

*Clutch control mechanism*

In the event that the suction head 80 fails to pick up a sheet at the proper time or in the event that no master card is at the detector station which actuates switch 390 at the proper time, I provide mechansim for automatically disengaging the main driving clutch 520. Due to the fact that the vacuum is automatically raised and lowered in the suction head 80, the safety clutch actuating mechansim must be so timed that the clutch is not thrown during normal decrease of vacuum. Furthermore, it will be noted that the safety mechanism for the clutch is connected only with the suction head 80 and not the suction head 76 because an interruption in the flow of master cards should be detected directly before the printing station in order to stop the machine should a card become detached from the grippers between the gripper feed station and the printing station.

Referring therefore to Figs. 45–50, the main drive shaft 403 is provided with a worm 521 which engages worm wheel 427 and the shaft is suitably journaled in a housing 522 by means of annular bearings 523, 523. The main motor (not shown) is connected to a pulley 524 keyed to shaft 403 between housing 522 and the terminal support 283*a* for the shaft. Clutch 520 associated with pulley 524 is engaged and disengaged by means of a sliding collar 526 actuated by a clutch yoke 527 pivoted to bracket 528. Manual operation of the clutch 520 is provided by means of a lever 529 connected to the yoke 527. A friction disk brake 530 is associated with housing 522 and clutch collar 526 in such a manner that when the clutch 520 is disengaged, brake 530 serves to stop the machine instantaneously.

An extension 531 on clutch yoke 527 is pivotally engaged with a spring-loaded bar 532 slidably mounted in posts 533 and 534. Helical extension spring 535 is connected to the righthand end of bar 532 and to post 533. Posts 533 and 534 also slidably support an upper bar 536 which is connected to post 533 by means of helical extension spring 537. Bar 536 is connected to a rocker arm 538 by means of an adjustable link 539 and the rocker arm 538 is actuated from cam 426 on shaft 425 by means of a cam roller 540. Cam 426 has a high lobe 426*a*, a medium lobe 426*b*, and a low lobe 426*c*. Figs. 45 and 48 show the cam roller 540 on the high lobe 426*a*, whereas Fig. 46 shows the roller on the medium lobe, and Fig. 47 on the low lobe.

A starting lever 541 on the opposite side of the machine is keyed to cross shaft 542 which carries a lever 543 and an arm 544 which limits movement of shaft 542 between stops 545, 545. Lever 541 at one end of shaft 542 is urged to turn clockwise as seen in Fig. 45, by a helical extension spring 546 connected to arm 547 which is keyed to the opposite end of shaft 542. In the normal operation of the duplicator, it may be assumed that clutch 520 has been disengaged and the motor started to turn pulley 524. The operator then raises lever 541 which depresses a pawl 550 slidably supported in a bracket 551 carried by the lower bar 532 and spring-loaded upwardly by means of spring 552. This releases pawl 550 from engagement with a notch 553 in the upper bar 536 and consequently enables the operator to engage clutch 520 by means of lever 529 regardless of the position of cam 426. Engagement of the clutch starts the duplicator mechanism and also rotates shaft 425 and cam 426 in a clockwise direction. In the sector marked "no vacuum," the valve 371 is held open by cam 374 described previously, and this condition of "no vacuum" remains until the roller is substantially halfway across the medium cam 426*b* (as shown in Fig. 46). When the roller drops from the high lobe 426*a* to the medium lobe 426*b*, rocker arm 538 shifts the upper bar 536 to the left as shown in Fig. 46, and causes a cam plate 554 carried on the upper bar 536 to engage a roller 555 on the pawl 550, thus transferring control of pawl 550 from the under surface of bar 536 to the cam plate 554 since the operator has now released lever 541.

In this position of cam 426, valve 371 closes and the suction head is oscillated to engage the next successive sheet ST. If a sheet is present, increased vacuum in conduits 274, 556 and 557 causes the piston 558 in cylinder 559 to move to the left (as shown in Fig. 46) thus pivoting a latch 560 to engage a detent 561 on pawl 550. Latch 560 is held in position either up or down, by means of a spring-loaded toggle link 562. As cam 426 continues to turn, roller 540 passes onto low lobe 426*c* to displace bar 536 farther to the left (as shown in Fig. 47). In this position however, it will be noted that cam plate 554 has passed beyond roller 555 so that the pawl 550 is held depressed only by the latch 560. Further turning of cam 426 displaces roller 540 and arm 538 by reason of the high lobe 426*a* to slide the upper bar 536 to the right (as shown in Fig. 45). This in turn pivots latch 560 to its down position through a bell crank 563 actuated by a pin 564 on bar 536 and which is connected to latch 560 by means of a link 565. It will be apparent that the above cycle repeats during normal operation of the duplicator and that the testing or critical position of the clutch control mechanism occurs when the roller 540 is on the low lobe 426*c* and the bars 536 and 532 are in the position of Fig. 47. In the event that there is insufficient vacuum in the line 557 for one reason or another to actuate piston 558 against the pressure of spring 556 when the roller is on the low lobe 426*c*, latch 560 will not be thrown to retain pawl 550 depressed. This immediately permits the pawl to spring upwardly as soon as roller 555 clears cam plate 554, thus locking the upper and lower bars together. Consequently, when the high lobe 426*a* of the cam 426 engages roller 540, arm 538 disengages the clutch 520 and applies brake 530, causing bars 536 and 532 to move to the right as a unit. A solenoid 567 is interconnected with latch 560 through a slotted link 568 in such a way that if switch 390 is closed due to the absence of a master card, the solenoid is energized to retract link 568 and hold the latch in the lowered position of Figs. 45–56. However, the presence of a card at the detector station keeps the circuit open to solenoid 567 through leads 569 and permits the latch to be thrown upward to the position of Fig. 47. Thus in normal operation the circuit for the solenoid is never closed by switch 390 because it is prevented by the presence of the master card. It is only when the switch is permitted to close because no card is present that the latch is held as shown in Fig. 45. The slotted connection between link 568 and the latch as well as the piston rod 570 of piston 558, allows sufficient overtravel for normal operation with the solenoid deenergized.

*Pneumatic diagram*

Fig. 51 illustrates the various fluid and electrical connections to the safety control devices and related parts of the duplicator, which previously have been described. Since the valve 187 for the master card feed does not control the clutch, I provide a separate blower 575 having its suction intake 576 in communication with the suction lines 188 and 144. The discharge 577 of the blower is connected to the line 143 for the nozzles 141. The blower 578 has its discharge 579 connected to the conduit 580 for air nozzles 259, 259 and its intake 581 connected to suction line 582 which communicates with lines 360, 274, 556 and 557 through a cross 583.

Fig. 52 shows a modified control for the moistening roll 84 which may be useful in the event that the sheets ST do not stack level and are relatively wide. Sometimes under these conditions, one or more of the suction nozzles 269 might not be completely closed even though a sheet is being transferred to the drum grippers. In this event, the increase in vacuum in housing 357 might be insufficient to release the moistening roll and permit it to operate normally. Therefore, the control of the moistening roll may be electrical rather than by suction. In this event, I employ a detector 584 which may be located very near the edge of drum 77 and positioned to fall into an annular groove 585 in the drum in the event there is no sheet transferred to the drum. The piston 358 in housing 357 is then actuated by means of a solenoid 586 connected to a switch 587 so that if a sheet ST is present on the drum 77 at the proper time, piston 358 is retracted due to energization of solenoid 586 in the same manner that has been described when the piston is actuated by the increase in vacuum.

*Self-righting feed table*

Referring now to Figs. 53–59, the modified table shown therein is very effectively used in the event that the stack of sheets or copy stock to which the data are to be transferred comprises folders, leaflets or pamphlets having one or more edges or sides of greater thickness than other edges or sides. In this event, it will be apparent that such a stack will not be true top and bottom, so that if the feed table for the copy stock is horizontal both longitudinally and transversely, the top folder or leaflet will be tilted at such an angle that it will not be properly picked up by the suction head assembly 80. However, the feed table 93 previously described, is entirely satisfactory where the stack ST is of substantially uniform height at all four corners. Therefore, in order to provide an automatically compensating table which will be level at its maximum elevated position and which will have a sufficient tilt in two directions to compensate for any irregularities in the dimensions of the height of copy stack, I incorporate a very simple and effective means which always presents the topmost leaflet or pamphlet 600 of a leaflet stack LS substantially horizontal in all directions at the take-off station.

For this purpose, I employ a modified carriage assembly 601 having side plates 602, 602 connected by cross bars 603 and 604. The carriage 601 has rollers 605, 605 which operate in vertical guides 239, 239 in the same manner that has been described in conjunction with the feed carriage 94. The feed table proper 606 is T-shaped and is supported on two bifurcated yokes 607 and 608, the latter of which is connected to and supported on a rotatable cross shaft 609 through a universal joint 610. Shaft 609 is journaled at one end in a bracket 611 connected to cross bars 603 and 604, and at the other end to one of the carriage plates 602. A long lever 612 is keyed to shaft 609 and is provided with a roller 613 at the opposite end. The roller 613 moves vertically in a track or channel 614 pivotally anchored at its upper end in a bracket 615 and is provided at its lower end with a clamping nut 616 slidable in an arcuate slot 617 on plate 618. It will be understood that the channel 614 may be pivoted and clamped in any predetermined position by means of the nut 616. Pivoting of the bracket tilts the table 606 longitudinally with regard to the duplicating machine so that as seen in Fig. 53, the table is turned clockwise or counterclockwise in accordance with the position of channel 614. Fig. 53 shows the table lowered and tilted in a maximum position in which the roller 613 is all the way down and the channel 614 is all the way to the right. The position of the upper journal or pivot 619 for channel 614 is so located that when the roller 613 is in registry with the pivot 619 (as shown in Fig. 54) the table 606 is level and this occurs when the carriage 601 is in its maximum elevated position.

In a similar manner, transverse tilting of the carriage is provided through yoke 607 which is connected to the upper ball swivel of a link 620 and the lower end of link 620 is connected through a similar ball swivel joint to one arm **621*a* of bell crank 621. Crank 621 is likewise journaled in bracket 611 and is provided with a long arm 621*b* which carries a roller 624 cooperating with a channel guide 625. Fig. 55 shows channel guide 625 clamped in a maximum pivoted position by means of a clamping nut 626 slidable in arcuate slot 627 of plate 628. The upper end of channel 625 is pivoted to bracket 629 at 630 and the location of the pivot point 630 is such that when the roller 624 is in registry with the pivot (as shown in Fig. 56) the table 606** is level transversely of the machine.

It will be apparent from the above described construction that the table is self-righting as the carriage automatically rises to feed the leaflets 600 to the printing drum. In order to obtain the correct setting for the table for any desired stack LS, it is only necessary to lower the carriage, place the stack on the table, and then raise the carriage manually until the topmost leaflet is at the proper take-off station. Channels 625 and 614 are then pivoted as may be required to level the topmost leaflet of the stack. With the channels thus clamped to their respective plates 618 and 628, every leaflet is absolutely level when it reaches the take-off position.

Since a high stack may have a very substantial tilt in one or two directions, it is necessary to modify the supporting structure for the stack in such a way that the leaflets will be fed or guided to the exact take-off location without binding and without difficulty due to a decrease in the horizontal dimension of the stack which is incident to the tilting thereof. The upper guide structure comprising track 250 is substantially the same as that described in conjunction with table 93. In this event however, the bar 253 may be welded or otherwise permanently attached to the sliding bracket 251 which can be locked on track 250 by means of a thumb screw 252. The corner guides 254, 254 are slidable transversely on bar 253 and may be locked thereon by means of thumb screws 631, 631. These guides 254 are adjusted so that the top leaflet in the stack LS is in the proper take-off position but the vertical length of the brackets extends downwardly below such a position only far enough to insure that the leaflets are accurately guided and controlled as the carriage or table rises. The fixed corner guides 256, 256 are supported at their upper ends by brackets 258, 258 on cross shaft 257 and at their lower ends by notched arms 632 which fit over cross bar 633.

The adjustable upright guides 635, 635 are each mounted on slidable brackets 636, 636 movable on transverse bar 637 and are capable of being locked thereon by means of thumb screws 638, 638. Bar 637 is in turn rigidly secured to a longitudinally slidable bracket 639 which may be clamped to longitudinal track 640 by means of a thumb screw 641. Track 640 as well as guides 635, 635 and their associated structure are supported on posts 642, 642 mounted on frame member 643. Fig. 57 shows how a stack of leaflets can thus be supported from top to bottom to provide elevation without binding and in such a way that the stack will not slide either longitudinally or transversely. The guide structure is such that the height of the stack on table 606 is clearly visible at all times and the stack may be replenished without the necessity of moving the guides at all.

Another feature that is particularly important in picking up relatively heavy leaflets or folders 600 is shown in Fig. 60 in which each individual suction nozzle proper 269 is provided with removable inserts 645 retained in the nozzles by means of set screws 646, 646. The insert 645 carries a flared resilient annular mouth 647 which is retained securely in the insert by a ferrule 648. By loosening set screw 646, the special insert 645 may be readily replaced with a standard insert 649 (such as shown in Fig. 61) for use with relatively lighter sheets or leaflets.

It will thus be understood that I have provided a fully automatic duplicating machine which is capable of handling practically any form of copy stock or sheets to which it may be desired to transfer data such as mailing addresses. The important features of the machine are its ruggedness, accuracy, and freedom from frequent shutdowns for adjustments or other reasons. Its ability to handle the master cards time after time with a minimum of wear and damage to the cards is outstanding. The range of adjustment enables the data to be imprinted at any desired location on the copy stock.

The absence of shock and vibration which permit higher operating speeds is due in large measure to the particular design of the Geneva motion which enables the conveyer chains to be rapidly accelerated and decelerated. The self-righting feed table for the copy stock mechanism enables the present duplicator to handle subject matter which heretofore has always necessitated hand feeding.

The numerous safety features are intended to cope with any condition which would cause an unnecessary shutdown, not only by preventing occurrence of the condition as in controlling the actuation of the moistening roll in accordance with delivery of sheets to the drum, but also in quickly stopping the machine in the event there is a skip, thus avoiding excessive time which would be otherwise consumed in making re-runs, cleaning and resetting.

Considering the accuracy and speed of the machine, it is extremely compact and comparatively less complicated than any other device within my knowledge.

Having thus described my invention, I claim:

1. A continuous automatic duplicator for transferring data from a stack of master cards to copy sheets and the like, comprising a feed table for the master cards, a transfer station at which data on the cards are imprinted on the copy sheets, a stacker for receiving the cards after said sheets are imprinted, a pair of spaced endless conveyers for transporting master cards from the feed table through the transfer station and then delivering the cards to the stacker, means carried by said conveyers for gripping the cards continuously while being transported from the feed table through the transfer station, means for intermittently operating the conveyers, and means operative in timed relation with the conveyors and when the conveyors are stationary for feeding cards from the table to the card gripping means on the conveyers.

2. A continuous automatic duplicator for transferring data from a stack of master cards to copy sheets and the like, comprising a feed table for the master cards, a transfer station at which data on the cards are imprinted on the copy sheets, a stacker for receiving the cards after said sheets are imprinted, a pair of spaced endless conveyers for transporting master cards from the feed table through the transfer station and then delivering the cards to the stacker, means for intermittently actuating said conveyors, a plurality of pairs of laterally aligned grippers on the conveyers for gripping the cards continuously while being transported from the feed table through the transfer station, means operating in timed relation to the conveyors for feeding cards from the table to the grippers when the conveyers are stationary, and means for opening and closing said grippers before the conveyers begin the successive intermittent movement.

3. A continuous automatic duplicator for transferring data from a stack of master cards to copy sheets and the like, comprising a feed table for the master cards, a transfer station at which data on the cards are imprinted on the copy sheets, a stacker for receiving the cards after said sheets are imprinted, a pair of spaced endless conveyers for transporting master cards from the feed table through the transfer station and then delivering the cards to the stacker, means carried by said conveyers for positively and continuously gripping the cards while being transported from the feed table through the transfer station, means for intermittently actuating the conveyers, means operating in timed relation with the intermittent operation of the conveyors for feeding master cards from the table to the grippers while the conveyors are stationary, means for actuating the card gripping means to receive a master card so fed from the feed table, means for actuating the card gripping means to release the master card upon arrival in a zone adjacent the stacker, a pair of secondary spaced endless conveyers positioned under the first-named conveyers at said release zone, and means carried by said secondary conveyers for advancing the cards towards the stacker after release of the cards from the first-named conveyers.

4. A continuous automatic duplicator for transferring data from a stack of master cards to copy sheets and the like, comprising a feed table for the master cards, a transfer station and transfer mechanism at said station by which data on the cards are imprinted on the copy sheets, a stacker for receiving the cards after said sheets are imprinted, a pair of spaced endless conveyers for transporting master cards from the feed table through the transfer station and then delivering the cards to the stacker, means carried by said conveyers for gripping the cards while being transported from the feed table through the transfer station, means for intermittently actuating the conveyers, means for transferring cards from the feed table to the conveyors and for actuating said table to present the cards to the said card transfer means, means for actuating the card gripping means to receive a master card transferred thereto from the feed table, means for actuating the card gripping means to release the master card upon arrival in a zone adjacent the stacker, a pair of secondary spaced endless conveyers positioned under the first-named conveyers at said release zone, means carried by said secondary conveyers for advancing the cards towards the stacker after release of the cards from the first-named conveyers, a pivoting blade retractable to permit the secondary conveyers to advance a card into the stacker and operable after said card is advanced substantially into the stacker to align the card accurately therein, means for actuating the stacker to receive the cards from the secondary conveyor and said blade, driving means for the feed table and the transfer mechanism and the stacker, and means connecting said driving means to the first and second conveyers and to said blade for actuating the conveyers and blade in timed relation with the feed table, the transfer mechanism, and the stacker.

5. Apparatus in accordance with claim 4, in which said connecting means comprises a modified Geneva motion for gradually accelerating and decelerating the intermittent motion of the conveyers.

6. A continuous automatic duplicator for transferring data from a stack of master cards to copy sheets and the like, comprising a feed table for the master cards, a transfer mechanism including means for effecting pressurized contact between the cards and the sheets to imprint card-carried data on the sheets, a stacker for receiving the cards after said sheets are imprinted, a pair of spaced endless conveyers for transporting master cards from the feed table through the transfer mechanism and then feeding the cards to the stacker, means on said conveyers for gripping each master card sequentially and for retaining said card during its movement through the transfer mechanism, means for intermittently actuating the conveyers, means operative when the conveyors are stationary for advancing a card from the feed table to said gripping means, means for intermittently elevating the feed table as master cards are transferred from the table to the card gripping means on the conveyers, a feed table for the copy sheets adjacent the transfer station, means for intermittently elevating the copy sheet feed table as copy sheets are transferred from the table, and means for transferring copy sheets from the copy sheet feed table to the said transfer mechanism.

7. In automatic mechanism for continuously transferring data from a stack of master cards to copy sheets and the like, the combination that comprises a feed table for the master cards, a transfer mechanism including means for effecting pressurized contact between the cards and the sheets to imprint card-carried data on the sheets, a stacker for receiving the cards after said sheets are imprinted, a pair of spaced primary conveyer chains for transporting master cards from the feed table through the transfer mechanism and then feeding the cards to the stacker, gripper means on each of said conveyer chains for engaging each master card sequentially and for continuously retaining the cards from the feed table through the transfer mechanism, a pair of secondary conveyer chains contiguous the stacker, means for releasing the grippers on the primary conveyer chains in a zone adjacent the secondary conveyer chains, means on the secondary chains for advancing the master cards towards the stacker after release by the primary chain grippers, and a pivoting stop in alignment with the primary conveyer chains for preventing excessive overtravel of the cards after release by the primary chain grippers.

8. In automatic mechanism for continuously transferring data from a stack of master cards to copy sheets and the like, the combination that comprises a feed table for the master cards, a transfer mechanism including means for effecting pressurized contact between the cards and the sheets to imprint card-carried data on the sheets, a stacker for receiving the cards after said sheets are imprinted, a pair of spaced primary conveyer chains for transporting master cards from the feed table through the transfer mechanism and then feeding the cards to the stacker, gripper means on each of said conveyer chains for engaging each master card sequentially at the feed table and for retaining the card through the transfer mechanism, a pair of secondary conveyer chains contiguous the stacker, means for releasing the grippers on the primary conveyer chains in a zone adjacent the secondary conveyer chains, means on the secondary chains for advancing the master cards towards the stacker after release by the primary chain grippers, a pivoting stop in alignment with the primary conveyer chains for preventing excessive overtravel of the cards after release by the primary chain grippers, and a pusher blade operative to deliver each master card into the stacker after the card has passed beyond control of the secondary conveyer.

9. In automatic mechanism for continuously transferring data from a stack of master cards to copy sheets and the like, the combination that comprises a feed table for the master cards, a transfer mechanism including means for effecting pressurized contact between the cards and the sheets to imprint card-carried data on the sheets, a vertically reciprocating table for receiving the cards after said sheets are imprinted, a plurality of vertical guide members in alignment with the corners of said table, means associated with the guide members for retaining a stack of master cards in an elevated position while additional cards are fed under the stack, a primary conveyer for transporting master cards from the feed table through the transfer mechanism and then towards the table, gripper means on said primary conveyer for grasping at least two corners of each master card, a secondary conveyer positioned below the primary conveyer and between the table and the terminus of the primary conveyer, means for actuating the gripper means on the primary conveyer to release the master cards, a guide rail positioned between the conveyers to receive the master cards when released by the gripper means, at least one pusher on the secondary conveyer for advancing the master cards along the guide rail toward the table after release by the grippers, driving means for the primary conveyer, driving means for the secondary conveyer, a positive continuous driving connection between said two last-named driving means, an intermittent gear on one of said driving connections, a complete gear on the other of said driving connections meshing with the intermittent gear, a triangular arm integrally attached to one of said driving connections, a plate attached to the other of said driving connections, a plurality of rollers on said plate for engaging at least two faces of said triangular plate in timed relation with the meshing of the gear segments, whereby the gear segments are brought up to substantially equal peripheral speed just prior to initial meshing thereof, and means for interlocking the driving connections with respect to each other when the gear segments are disengaged.

10. In an automatic duplicator for continuously transferring data from a plurality of master cards to copy sheets and the like of a type having means for feeding master cards sequentially to a transfer station, driving means for said feeding means, means for transferring data from the cards to copy sheets whereby the data are imprinted on the sheets, and means for receiving and stacking said sheets and cards after imprinting, the improvement that comprises a detecting finger positioned normally in the path of master cards being supplied to the transfer mechanism, means actuated by the duplicator mechanism for displacing the finger to permit the cards to be advanced towards the transfer mechanism without contact between the finger and the leading edge of the card, means for releasing the finger after passage of the leading edge and before the card has reached the transfer station to permit contact of the finger and the card, a switch associated with the finger, said switch being connected to the finger so that when the finger is not restrained by a master card in position at the detecting station the switch is actuated, means including a clutch for stopping the driving means, and means responsive to the detecting means for actuating said clutch when the absence of a card is detected at said station.

11. In an automatic duplicator for continuously transferring data from a plurality of master cards to copy sheets and the like of the type having means for feeding master cards sequentially to a transfer station, driving means for said feeding means, means for transferring data from the cards to copy sheets whereby the data are imprinted on the sheets, and means for receiving and stacking said sheets and cards after imprinting, the improvement that comprises a clutch connecting the driving means and the feeding means, a yoke for engaging and disengaging said clutch, a cam drivingly connected to the feeding means, a member having a selective operable connection between the cam and the yoke for disengaging the clutch by movement of the cam when the member is in a first position and permitting the clutch to remain engaged when the member is in a moved position, and means responsive to the presence of sheet material in the duplicator at a predetermined station for controlling the position of the member.

12. In an automatic duplicator for continuously transferring data from a plurality of master card elements to copy sheet elements and the like of the type having means for feeding master cards sequentially to a transfer station, driving means for said feeding means, means for transferring data from the card elements to copy sheet elements whereby the data are imprinted on the sheet elements, and means for receiving and stacking said sheet and card elements after imprinting, the improvement that comprises a clutch connecting the driving means and the feeding means, a yoke for engaging and disengaging said clutch, a cam drivingly connected to the feeding means, a member having a selective operable connection between the cam and the yoke for disengaging the clutch by movement of the cam when the member is in a first position and permitting the clutch to remain engaged when the member is in a moved position, a detector for determining the presence of a master card element at a predetermined station, a detector for determining the presence of a copy sheet element at a predetermined station, and control means for the member responsive to each of said detectors for positioning the member in accordance with the presence of a master card or a copy sheet at either of said stations.

13. Apparatus in accordance with claim 12, in which one of the detectors comprises suction means at the associated station, and means for bringing the suction means into element-engaging position.

14. A continuous automatic duplicator for transferring data from master cards to copy sheets and the like, said duplicator comprising an endless conveyor for transporting master cards to and through a transfer station, card positioning means on said conveyor, means for intermittently actuating the conveyor so as to advance the positioning means in continuous movement through the transfer station while momentarily interrupting the movement of the positioning means at a position in advance of said station, means operating in timed relation with the conveyor for feeding master cards to the conveyor and into engagement with said positioning means at said position while the conveyor is stationary, means operating in timed relation with the conveyor for bringing copy sheets successively to the transfer station in registration with the master cards on the conveyor and for uninterruptedly moving the sheets through said station in synchronism with the cards, and means at said station operating in timed relation with the conveyor for pressing the master cards and sheets together to effect the said transfer while in transit through the station.

15. An automatic duplicator according to claim 14 wherein the means for bringing the copy sheets to the transfer station comprises a continuously rotating drum, sheet retaining and positioning means on the drum, and means for feeding sheets successively to said retaining and positioning means.

16. A duplicator according to claim 14 including detector means adapted to coact with the card at a detection point in advance of the transfer station and while the card is stationary, and control devices for the imprinting means responsive to said detector means.

17. An automatic duplicator according to claim 15 wherein the said transfer means comprises a continuously rotating pressure roll cooperative with the drum to press the master cards against the copy sheets.

18. A duplicator according to claim 16 wherein means is provided for rendering the detector means inoperative with respect to the card while the latter is in transit to said point of detection.

19. A continuous automatic duplicator for transferring data from a stock of master cards to copy sheets and the like, said duplicator comprising a feed table for the master cards, a transfer mechanism including a rotary drum and means for effecting pressure contact between the cards and the sheets against the drum to imprint card-carried data on the sheets, a stacker for receiving the cards after said sheets are imprinted, a pair of spaced endless conveyors for transporting master cards from the feed table through the transfer mechanism and then feeding the cards to the stacker, a plurality of pairs of laterally aligned grippers on the conveyor for continuously retaining the cards in their movement through the transfer mechanism, means for intermittently actuating the conveyors in timed relation to the rotary movement of the drum, means operative when the conveyors are stationary for advancing a master card from the feed table to the grippers on the conveyors, means for intermittently elevating the feed table as master cards are transferred from the table to the grippers on the conveyors, a plurality of grippers at the periphery of the drum for gripping the copy sheets, a feed table for the copy sheets adjacent the transfer station, means for transferring copy sheets from the copy sheet feed table to the grippers on the drum, and means for intermittently elevating the copy sheet feed table as copy sheets are transferred from the table to the drum.

20. In a continuous automatic duplicator for transferring data from master cards to copy sheets and the like, the combination that comprises an endless conveyor for transporting master cards through a transfer station, means for intermittently actuating said conveyor, card gripping means on the conveyor, means for feeding individual master cards to the conveyor while the latter is stationary, means operating in timed relation with said feeding means for opening and closing said gripping means to receive and grip the cards as they are fed to the conveyor and while the conveyor is stationary, a drum at said transfer station, means for continuously rotating said drum, copy sheet gripping elements on said drum, means for feeding copy sheets successively to said gripping elements, and means operating in timed relation with said sheet feeding means for actuating the gripper elements to receive and grip the sheets as they are fed to the drum, means for operating the drum in timed relation with the intermittent movement of the conveyor so as to bring the cards and sheets together in superimposed relation at the transfer station, means operative while the superimposed cards and sheets are moving through the transfer station for exerting pressure on the cards to press the cards against the sheets to effect the transfer operation, and means for subsequently actuating the grippers on the conveyor and on the drum to release the cards and sheets.

References Cited in the file of this patent

UNITED STATES PATENTS

| | | |
|---|---|---|
| 1,153,339 | Rogers | Sept. 4, 1915 |
| 1,229,057 | Fritch | June 5, 1917 |
| 1,564,221 | Duncan | Dec. 8, 1925 |
| 1,804,406 | Federwitz | May 12, 1931 |
| 1,836,764 | Lorentzen | Dec. 15, 1931 |
| 2,054,344 | Storck | Sept. 15, 1936 |
| 2,081,958 | Root | June 1, 1937 |
| 2,108,613 | Rider | Feb. 15, 1938 |
| 2,137,381 | Blackstone | Nov. 22, 1938 |
| 2,163,492 | Kelly | June 20, 1939 |
| 2,175,665 | Kluitmann | Oct. 10, 1939 |
| 2,181,211 | Sieg | Nov. 28, 1939 |
| 2,237,363 | Ritzerfeld | Apr. 8, 1941 |
| 2,268,657 | Hermann | Jan. 6, 1942 |
| 2,288,290 | Marchev | June 30, 1942 |
| 2,344,345 | Elliott | Mar. 14, 1944 |
| 2,363,554 | Ryan | Nov. 28, 1944 |
| 2,381,430 | Belluche | Aug. 7, 1945 |
| 2,399,175 | Ford | Apr. 30, 1946 |
| 2,405,373 | Seeley | Aug. 6, 1946 |
| 2,414,813 | Hueber | Jan. 28, 1947 |
| 2,425,680 | Kaddeland | Aug. 12, 1947 |
| 2,437,792 | Schneider | Mar. 16, 1948 |
| 2,442,574 | Storck | June 1, 1948 |
| 2,511,670 | Gollwitzer | June 13, 1950 |
| 2,539,839 | Jagger | Jan. 30, 1951 |
| 2,572,450 | Crissy | Oct. 23, 1951 |
| 2,595,346 | Federwitz | May 6, 1952 |
| 2,598,523 | Federwitz | May 27, 1952 |
| 2,615,390 | Sauerman | Oct. 28, 1952 |
| 2,619,898 | Gollwitzer | Dec. 2, 1952 |